US009542667B2

(12) United States Patent
Taboada et al.

(10) Patent No.: US 9,542,667 B2
(45) Date of Patent: Jan. 10, 2017

(54) NAVIGATING MESSAGES WITHIN A THREAD

(75) Inventors: Roberto C. Taboada, Duvall, WA (US); Bertille N. Fernandes, Bellevue, WA (US); Brian M. Jones, Redmond, WA (US); Joe K. Yap, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 802 days.

(21) Appl. No.: 11/332,822

(22) Filed: Jan. 13, 2006

(65) Prior Publication Data
US 2007/0061738 A1    Mar. 15, 2007

Related U.S. Application Data

(60) Provisional application No. 60/715,725, filed on Sep. 9, 2005.

(51) Int. Cl.
G06F 9/44        (2006.01)
G06F 9/46        (2006.01)
G06Q 10/10       (2012.01)

(52) U.S. Cl.
CPC .................................. *G06Q 10/107* (2013.01)

(58) Field of Classification Search
None
See application file for complete search history.

(56) References Cited

U.S. PATENT DOCUMENTS

| 4,815,029 | A | 3/1989 | Barker et al. | |
|---|---|---|---|---|
| 4,823,283 | A | 4/1989 | Diehm et al. | 715/825 |
| 5,155,806 | A | 10/1992 | Hoeber et al. | 715/711 |
| 5,220,675 | A | 6/1993 | Padawer et al. | |
| 5,243,697 | A | 9/1993 | Hoeber et al. | |

(Continued)

FOREIGN PATENT DOCUMENTS

| AU | 2005203411 | 3/2006 |
|---|---|---|
| AU | 2007255043 | 8/2012 |

(Continued)

OTHER PUBLICATIONS

The Discussion Board Component of Blackboard: An Instructors Guide; Aug. 2004; 23 pages.*

(Continued)

*Primary Examiner* — H S Sough
*Assistant Examiner* — Kimberly Jordan
(74) *Attorney, Agent, or Firm* — Jessica Meyers; Tom Wong; Micky Minhas

(57) ABSTRACT

A user may easily read, browse, and jump through the messages contained within a thread. Different portions of the message may be highlighted such that they are easily identifiable. The user may easily navigate through the thread by selecting a user interface element, such as an arrow button, to move to the next or previous message within the thread. The order of the thread may also be reversed such that the user may view the thread from the first message to the last message, or view the thread from the last message to the first message. The messages within the thread may be marked, such as by using XML tags, in order to facilitate the identification of the sections of the messages within the thread.

20 Claims, 8 Drawing Sheets

(56) References Cited

U.S. PATENT DOCUMENTS

| | | | |
|---|---|---|---|
| 5,247,438 A | 9/1993 | Subas et al. ............... 700/90 |
| 5,305,435 A | 4/1994 | Bronson |
| 5,307,086 A | 4/1994 | Griffin et al. |
| 5,323,314 A | 6/1994 | Baber et al. ............... 705/8 |
| 5,377,354 A | 12/1994 | Scannell et al. ............ 718/103 |
| 5,412,772 A | 5/1995 | Monson |
| 5,457,476 A | 10/1995 | Jenson |
| 5,461,708 A | 10/1995 | Kahn |
| 5,500,936 A | 3/1996 | Allen et al. ............... 395/156 |
| 5,502,805 A | 3/1996 | Anderson et al. |
| 5,519,606 A | 5/1996 | Frid-Nielsen et al. ......... 705/9 |
| 5,559,875 A | 9/1996 | Bieselin et al. ........ 379/202.01 |
| 5,559,944 A | 9/1996 | Ono ............... 715/841 |
| 5,570,109 A | 10/1996 | Jenson ............... 715/823 |
| 5,581,677 A | 12/1996 | Myers et al. |
| 5,588,107 A | 12/1996 | Bowden et al. ............ 715/828 |
| 5,592,602 A | 1/1997 | Edmunds |
| 5,596,694 A | 1/1997 | Capps ............... 345/473 |
| 5,625,783 A | 4/1997 | Ezekiel et al. ............ 395/352 |
| 5,634,100 A | 5/1997 | Capps ............... 705/9 |
| 5,634,128 A | 5/1997 | Messina ............... 710/200 |
| 5,638,504 A | 6/1997 | Scott et al. ............... 715/202 |
| 5,644,737 A | 7/1997 | Tuniman et al. ............ 715/810 |
| 5,659,693 A | 8/1997 | Hansen et al. ............ 715/779 |
| 5,664,127 A | 9/1997 | Anderson et al. ............ 715/209 |
| 5,664,208 A | 9/1997 | Pavley et al. ............... 715/209 |
| 5,673,403 A | 9/1997 | Brown et al. ............... 715/744 |
| 5,694,610 A | 12/1997 | Habib et al. |
| 5,721,847 A | 2/1998 | Johnson ............... 715/786 |
| 5,734,915 A | 3/1998 | Roewer ............... 395/773 |
| 5,751,373 A | 5/1998 | Ohyama et al. |
| 5,760,768 A | 6/1998 | Gram ............... 345/333 |
| 5,760,773 A | 6/1998 | Berman et al. ............... 715/808 |
| 5,761,646 A | 6/1998 | Frid-Nielsen et al. ......... 705/9 |
| 5,764,960 A | 6/1998 | Perks et al. |
| 5,778,402 A | 7/1998 | Gipson ............... 715/201 |
| 5,778,404 A | 7/1998 | Capps et al. ............... 715/531 |
| 5,787,295 A | 7/1998 | Nakao ............... 715/210 |
| 5,793,365 A | 8/1998 | Tang et al. ............... 715/758 |
| 5,796,393 A | 8/1998 | MacNaughton et al. |
| 5,805,167 A | 9/1998 | Van Cruyningen ......... 715/808 |
| 5,812,132 A | 9/1998 | Goldstein ............... 715/797 |
| 5,821,936 A | 10/1998 | Shaffer et al. ............... 715/810 |
| 5,828,376 A | 10/1998 | Solimene et al. ............ 715/821 |
| 5,838,321 A | 11/1998 | Wolf ............... 345/343 |
| 5,842,009 A | 11/1998 | Borovoy et al. ............ 707/1 |
| 5,844,558 A | 12/1998 | Kumar et al. ............... 345/339 |
| 5,844,572 A | 12/1998 | Schott ............... 345/440 |
| 5,844,588 A | 12/1998 | Anderson |
| 5,850,561 A | 12/1998 | Church |
| 5,855,006 A | 12/1998 | Huemoeller et al. ......... 705/9 |
| 5,864,848 A | 1/1999 | Horvitz et al. |
| 5,872,973 A | 2/1999 | Mitchell et al. |
| 5,873,108 A | 2/1999 | Goyal et al. ............... 715/203 |
| 5,874,953 A | 2/1999 | Webster et al. |
| 5,885,006 A | 3/1999 | Sheedy ............... 384/192 |
| 5,893,073 A | 4/1999 | Kasso et al. ............... 705/8 |
| 5,893,125 A | 4/1999 | Shostak ............... 715/206 |
| 5,898,436 A | 4/1999 | Stewart et al. ............... 345/354 |
| 5,899,979 A | 5/1999 | Miller et al. ............... 705/9 |
| 5,905,863 A | 5/1999 | Knowles et al. ............ 709/206 |
| 5,917,489 A | 6/1999 | Thurlow et al. |
| 5,924,089 A | 7/1999 | Mocek et al. |
| 5,926,806 A | 7/1999 | Marshall et al. ............ 707/3 |
| 5,936,625 A | 8/1999 | Kahl et al. ............... 715/775 |
| 5,937,160 A | 8/1999 | Davis et al. ............... 709/203 |
| 5,940,078 A | 8/1999 | Nagarajayya et al. ....... 345/346 |
| 5,940,847 A | 8/1999 | Fein et al. ............... 707/540 |
| 5,943,051 A | 8/1999 | Onda et al. ............... 715/786 |
| 5,960,406 A | 9/1999 | Rasansky et al. ............ 705/9 |
| 5,963,938 A | 10/1999 | Wilson |
| 5,970,466 A | 10/1999 | Detjen et al. ............... 705/8 |
| 5,999,173 A | 12/1999 | Ubillos |
| 5,999,938 A | 12/1999 | Bliss et al. ............... 707/102 |
| 6,008,806 A | 12/1999 | Nakajima et al. ............ 345/335 |
| 6,012,075 A | 1/2000 | Fein et al. ............... 707/540 |
| 6,016,478 A | 1/2000 | Zhang et al. ............... 705/9 |
| 6,018,343 A | 1/2000 | Wang et al. ............... 345/356 |
| 6,034,683 A | 3/2000 | Mansour et al. ............ 715/764 |
| 6,038,395 A | 3/2000 | Chow et al. |
| 6,038,542 A | 3/2000 | Ruckdashel ............... 705/9 |
| 6,043,816 A | 3/2000 | Williams et al. |
| 6,057,836 A | 5/2000 | Kavalam et al. |
| 6,067,087 A | 5/2000 | Krauss et al. ............... 715/762 |
| 6,067,551 A | 5/2000 | Brown et al. |
| 6,072,492 A | 6/2000 | Schagen et al. ............ 715/733 |
| 6,073,110 A | 6/2000 | Rhodes et al. |
| 6,073,142 A | 6/2000 | Geiger et al. |
| 6,085,206 A | 7/2000 | Domini et al. ............... 707/533 |
| 6,088,707 A | 7/2000 | Bates et al. |
| 6,092,103 A | 7/2000 | Pritsch |
| 6,101,480 A | 8/2000 | Conmy et al. ............... 705/9 |
| 6,133,915 A | 10/2000 | Arcuri et al. ............... 715/779 |
| 6,137,488 A | 10/2000 | Kraft |
| 6,154,755 A | 11/2000 | Dellert et al. |
| 6,175,363 B1 | 1/2001 | Williams et al. ............ 345/334 |
| 6,188,403 B1 | 2/2001 | Sacerdoti et al. ............ 715/764 |
| 6,189,024 B1 | 2/2001 | Bauersfeld et al. ......... 709/203 |
| 6,192,381 B1 | 2/2001 | Stiegemeier et al. ........ 715/210 |
| 6,195,094 B1 | 2/2001 | Celebiler ............... 715/764 |
| 6,199,102 B1 | 3/2001 | Cobb |
| 6,211,879 B1 | 4/2001 | Soohoo ............... 715/854 |
| 6,216,122 B1 | 4/2001 | Elson ............... 707/5 |
| 6,219,670 B1 | 4/2001 | Mocek et al. ............... 707/102 |
| 6,222,540 B1 | 4/2001 | Sacerdoti ............... 345/581 |
| 6,232,971 B1 | 5/2001 | Haynes ............... 715/800 |
| 6,236,396 B1 | 5/2001 | Jenson et al. ............... 715/764 |
| 6,237,135 B1 | 5/2001 | Timbol |
| 6,239,798 B1 | 5/2001 | Ludolph et al. |
| 6,256,628 B1 | 7/2001 | Dobson et al. ............ 707/6 |
| 6,269,341 B1 | 7/2001 | Redcay, Jr. ............... 705/8 |
| 6,272,488 B1 | 8/2001 | Chang et al. |
| 6,278,450 B1 | 8/2001 | Arcuri et al. ............... 345/334 |
| 6,289,317 B1 | 9/2001 | Peterson ............... 705/7 |
| 6,307,544 B1 | 10/2001 | Harding ............... 715/709 |
| 6,307,574 B1 | 10/2001 | Ashe |
| 6,311,195 B1 | 10/2001 | Hachiya et al. |
| 6,313,854 B1 | 11/2001 | Gibson |
| 6,323,883 B1 | 11/2001 | Minoura et al. ............ 715/784 |
| 6,326,962 B1 | 12/2001 | Szabo ............... 715/762 |
| 6,327,046 B1 | 12/2001 | Miyamoto et al. ......... 358/1.15 |
| 6,330,589 B1 | 12/2001 | Kennedy |
| 6,341,277 B1 | 1/2002 | Coden et al. ............... 707/718 |
| 6,342,901 B1 | 1/2002 | Adler et al. |
| 6,353,451 B1 | 3/2002 | Teibel et al. ............... 715/803 |
| 6,356,893 B1 | 3/2002 | Itakura et al. |
| 6,359,634 B1 | 3/2002 | Cragun et al. ............... 715/777 |
| 6,369,840 B1 | 4/2002 | Barnett et al. |
| 6,373,507 B1 | 4/2002 | Camara et al. ............ 345/825 |
| 6,374,304 B1 | 4/2002 | Chiashi |
| 6,384,849 B1 | 5/2002 | Morcos et al. ............... 715/810 |
| 6,385,769 B1 | 5/2002 | Lewallen |
| 6,405,216 B1 | 6/2002 | Minnaert et al. ......... 707/104.1 |
| 6,424,829 B1 | 7/2002 | Kraft ............... 455/412.1 |
| 6,429,882 B1 | 8/2002 | Abdelnur et al. ............ 345/763 |
| 6,430,563 B1 | 8/2002 | Fritz et al. ............... 707/694 |
| 6,433,801 B1 | 8/2002 | Moon et al. ............... 345/840 |
| 6,433,831 B1 | 8/2002 | Dinwiddie et al. ......... 348/553 |
| 6,434,598 B1 | 8/2002 | Gish ............... 709/203 |
| 6,442,527 B1 | 8/2002 | Worthington ............... 705/8 |
| 6,446,118 B1 | 9/2002 | Gottlieb |
| 6,456,304 B1 | 9/2002 | Angiulo et al. ............ 345/779 |
| 6,457,062 B1 | 9/2002 | Pivowar et al. ............ 709/248 |
| 6,459,441 B1 | 10/2002 | Perroux et al. ............ 345/837 |
| 6,466,236 B1 | 10/2002 | Pivowar et al. ............ 715/835 |
| 6,466,240 B1 | 10/2002 | Maslov |
| 6,469,722 B1 | 10/2002 | Kinoe et al. ............... 345/837 |
| 6,469,723 B1 | 10/2002 | Gould |
| 6,480,865 B1 | 11/2002 | Lee et al. ............... 715/523 |
| 6,484,180 B1 | 11/2002 | Lyons et al. |
| 6,493,006 B1 | 12/2002 | Gourdol et al. ............ 715/825 |
| 6,493,007 B1 | 12/2002 | Pang |
| 6,493,731 B1 | 12/2002 | Jones et al. ............... 715/234 |
| 6,507,845 B1 | 1/2003 | Cohen et al. ............... 707/608 |

(56) References Cited

U.S. PATENT DOCUMENTS

| | | | |
|---|---|---|---|
| 6,529,918 B2 | 3/2003 | Takahashi | |
| 6,546,417 B1 | 4/2003 | Baker | 709/206 |
| 6,567,509 B1 | 5/2003 | Gusler et al. | |
| 6,570,596 B2 | 5/2003 | Frederiksen | 715/808 |
| 6,578,192 B1 | 6/2003 | Boehme et al. | 717/115 |
| 6,583,798 B1 | 6/2003 | Hoek et al. | 345/822 |
| 6,584,501 B1 | 6/2003 | Cartsonis et al. | |
| 6,603,493 B1 | 8/2003 | Lovell et al. | |
| 6,618,732 B1 | 9/2003 | White et al. | 707/103 |
| 6,621,504 B1 | 9/2003 | Nadas et al. | 715/723 |
| 6,621,508 B1 | 9/2003 | Shiraishi et al. | 715/810 |
| 6,633,867 B1 | 10/2003 | Kraft et al. | |
| 6,635,089 B1 | 10/2003 | Burkett et al. | 715/513 |
| 6,654,791 B1 | 11/2003 | Bates et al. | |
| 6,664,983 B2 | 12/2003 | Ludolph | 715/775 |
| 6,680,749 B1 | 1/2004 | Anderson et al. | 348/231.99 |
| 6,686,938 B1 | 2/2004 | Jobs et al. | 345/835 |
| 6,691,281 B1 | 2/2004 | Sorge et al. | 715/234 |
| 6,701,513 B1 | 3/2004 | Bailey | |
| 6,707,454 B1 | 3/2004 | Barg | |
| 6,708,205 B2 | 3/2004 | Sheldon et al. | 709/206 |
| 6,721,402 B2 | 4/2004 | Usami | |
| 6,727,919 B1 | 4/2004 | Reder et al. | 715/810 |
| 6,732,330 B1 | 5/2004 | Claussen et al. | 715/513 |
| 6,734,880 B2 | 5/2004 | Chang et al. | 715/738 |
| 6,750,850 B2 | 6/2004 | O'Leary | |
| 6,750,890 B1 | 6/2004 | Sugimoto | 715/838 |
| 6,785,868 B1 | 8/2004 | Raff | 715/530 |
| 6,789,107 B1 | 9/2004 | Bates et al. | |
| 6,799,095 B1 | 9/2004 | Owen et al. | |
| 6,816,904 B1 | 11/2004 | Ludwig et al. | |
| 6,825,859 B1 | 11/2004 | Severenuk et al. | 345/764 |
| 6,826,729 B1 | 11/2004 | Giesen et al. | 715/837 |
| 6,832,244 B1 | 12/2004 | Raghunandan | |
| 6,847,989 B1 | 1/2005 | Chastain et al. | |
| 6,850,255 B2 | 2/2005 | Muschetto | 715/788 |
| 6,871,195 B2 | 3/2005 | Ryan et al. | 706/46 |
| 6,882,353 B2 | 4/2005 | Nettles et al. | |
| 6,882,354 B1 | 4/2005 | Nielsen | 715/784 |
| 6,892,196 B1 | 5/2005 | Hughes | |
| 6,895,426 B1 | 5/2005 | Cortright et al. | |
| 6,904,449 B1 | 6/2005 | Quinones | 709/203 |
| 6,906,717 B2 | 6/2005 | Couckuyt et al. | 345/440 |
| 6,907,423 B2 | 6/2005 | Weil et al. | |
| 6,915,492 B2 | 7/2005 | Kurtenbach et al. | 715/810 |
| 6,924,797 B1 | 8/2005 | MacPhail | 345/326 |
| 6,925,605 B2 | 8/2005 | Bates et al. | 709/206 |
| 6,928,613 B1 | 8/2005 | Ishii | |
| 6,934,740 B1 | 8/2005 | Lawande et al. | |
| 6,941,304 B2 | 9/2005 | Gainey et al. | |
| 6,956,429 B1 | 10/2005 | Elbanhawy | |
| 6,964,025 B2 | 11/2005 | Angiulo | 715/838 |
| 6,981,209 B1 | 12/2005 | Parikh et al. | |
| 6,983,889 B2 | 1/2006 | Alles | 236/49.1 |
| 6,988,241 B1 | 1/2006 | Guttman et al. | 715/503 |
| 6,990,637 B2 | 1/2006 | Anthony et al. | 715/851 |
| 6,990,652 B1 | 1/2006 | Parthasarathy et al. | |
| 6,990,654 B2 | 1/2006 | Carroll, Jr. | |
| 7,027,463 B2 | 4/2006 | Mathew et al. | |
| 7,032,210 B2 | 4/2006 | Alloing et al. | |
| 7,039,596 B1 | 5/2006 | Lu | 705/8 |
| 7,044,363 B2 | 5/2006 | Silverbrook et al. | |
| 7,046,848 B1 | 5/2006 | Olcott | 382/176 |
| 7,069,538 B1 | 6/2006 | Renshaw | |
| 7,085,757 B2 | 8/2006 | Dettinger | |
| 7,096,218 B2 | 8/2006 | Schirmer et al. | |
| 7,107,544 B1 | 9/2006 | Luke | 715/752 |
| 7,110,936 B2 | 9/2006 | Hiew et al. | 703/22 |
| 7,111,238 B1 | 9/2006 | Kuppusamy et al. | |
| 7,113,941 B2 | 9/2006 | Arend | |
| 7,117,370 B2 | 10/2006 | Khan et al. | 713/186 |
| 7,134,095 B1 | 11/2006 | Smith et al. | |
| 7,149,983 B1 | 12/2006 | Robertson et al. | 715/810 |
| 7,152,207 B1 | 12/2006 | Underwood et al. | 715/526 |
| 7,181,697 B2 | 2/2007 | Tai et al. | 715/779 |
| 7,188,073 B1 | 3/2007 | Tam et al. | 705/9 |
| 7,188,317 B1 | 3/2007 | Hazel | 715/804 |
| 7,200,636 B2 | 4/2007 | Harding | |
| 7,206,813 B2 | 4/2007 | Dunbar et al. | |
| 7,206,814 B2 | 4/2007 | Kirsch | |
| 7,212,208 B2 | 5/2007 | Khozai | 345/440 |
| 7,216,301 B2 | 5/2007 | Moehrle | 715/811 |
| 7,219,305 B2 | 5/2007 | Jennings | 715/761 |
| 7,240,323 B1 | 7/2007 | Desai et al. | 717/100 |
| 7,249,325 B1 | 7/2007 | Donaldson | 715/777 |
| 7,251,640 B2 | 7/2007 | Baumard | |
| 7,263,668 B1 | 8/2007 | Lentz | 715/801 |
| 7,277,572 B2 | 10/2007 | MacInnes et al. | |
| 7,287,233 B2 | 10/2007 | Arend | |
| 7,290,033 B1 | 10/2007 | Goldman et al. | 709/206 |
| 7,296,241 B2 | 11/2007 | Oshiro et al. | |
| 7,318,203 B2 | 1/2008 | Purves et al. | |
| 7,325,204 B2 | 1/2008 | Rogers | 715/792 |
| 7,328,409 B2 | 2/2008 | Awada et al. | 715/765 |
| 7,337,185 B2 | 2/2008 | Ellis et al. | 707/102 |
| 7,346,705 B2 | 3/2008 | Hullot et al. | 709/238 |
| 7,346,769 B2 | 3/2008 | Forlenza et al. | 713/151 |
| 7,356,772 B2 * | 4/2008 | Brownholtz et al. | 715/752 |
| 7,360,174 B2 | 4/2008 | Grossman et al. | 715/854 |
| 7,370,282 B2 | 5/2008 | Cary | |
| 7,386,535 B1 | 6/2008 | Kalucha et al. | |
| 7,386,835 B1 | 6/2008 | Desai et al. | 717/117 |
| 7,392,249 B1 | 6/2008 | Harris et al. | 707/5 |
| 7,395,221 B2 | 7/2008 | Doss et al. | 705/9 |
| 7,395,500 B2 | 7/2008 | Whittle et al. | |
| 7,421,660 B2 | 9/2008 | Charnock et al. | 715/751 |
| 7,421,690 B2 | 9/2008 | Forstall et al. | 709/206 |
| 7,426,713 B2 | 9/2008 | Duggan et al. | |
| 7,461,077 B1 | 12/2008 | Greenwood | |
| 7,464,343 B2 | 12/2008 | Shaw et al. | |
| 7,469,385 B2 | 12/2008 | Harper et al. | |
| 7,472,117 B2 | 12/2008 | Dettinger et al. | |
| 7,484,213 B2 | 1/2009 | Mathew et al. | |
| 7,499,907 B2 | 3/2009 | Brown et al. | |
| 7,505,954 B2 | 3/2009 | Heidloff et al. | 707/1 |
| 7,530,029 B2 | 5/2009 | Satterfield et al. | 715/779 |
| 7,555,707 B1 | 6/2009 | Labarge et al. | 715/234 |
| 7,565,403 B2 | 7/2009 | Horvitz et al. | |
| 7,567,964 B2 | 7/2009 | Brice et al. | 707/9 |
| 7,584,253 B2 | 9/2009 | Curbow et al. | |
| 7,627,561 B2 | 12/2009 | Pell et al. | 707/3 |
| 7,664,821 B1 | 2/2010 | Ancin et al. | 709/206 |
| 7,685,116 B2 | 3/2010 | Pell et al. | |
| 7,703,036 B2 | 4/2010 | Satterfield et al. | 715/777 |
| 7,707,255 B2 | 4/2010 | Satterfield et al. | 709/206 |
| 7,711,742 B2 | 5/2010 | Bennett et al. | 707/759 |
| 7,716,593 B2 | 5/2010 | Durazo et al. | 715/752 |
| 7,739,259 B2 | 6/2010 | Hartwell et al. | 707/706 |
| 7,747,966 B2 | 6/2010 | Leukart et al. | 715/792 |
| 7,788,598 B2 | 8/2010 | Bansal et al. | 715/810 |
| 7,802,199 B2 | 9/2010 | Shneerson et al. | |
| 7,831,902 B2 | 11/2010 | Sourov et al. | 715/220 |
| 7,853,877 B2 | 12/2010 | Giesen et al. | 715/711 |
| 7,865,868 B2 | 1/2011 | Falzone Schaw et al. | |
| 7,870,465 B2 | 1/2011 | VerSteeg | 714/774 |
| 7,886,290 B2 | 2/2011 | Dhanjal et al. | 717/170 |
| 7,895,531 B2 | 2/2011 | Radtke et al. | 715/810 |
| 8,117,542 B2 | 2/2012 | Radtke et al. | |
| 8,146,016 B2 | 3/2012 | Himberger et al. | |
| 8,150,930 B2 | 4/2012 | Satterfield et al. | |
| 8,201,103 B2 | 6/2012 | Dukhon et al. | |
| 8,239,882 B2 | 8/2012 | Dhanjal et al. | |
| 8,255,828 B2 | 8/2012 | Harris et al. | |
| 8,285,806 B2 | 10/2012 | Yu | |
| 8,402,096 B2 | 3/2013 | Affronti et al. | |
| 8,484,578 B2 | 7/2013 | Dukhon et al. | |
| 8,605,090 B2 | 12/2013 | Garg et al. | |
| 8,627,222 B2 | 1/2014 | Hartwell et al. | |
| 8,638,333 B2 | 1/2014 | Garg et al. | |
| 8,689,137 B2 | 4/2014 | McCormack et al. | |
| 8,762,880 B2 | 6/2014 | Dukhon et al. | |
| 8,799,808 B2 | 8/2014 | Satterfield et al. | |
| 8,839,139 B2 | 9/2014 | Leukart et al. | |
| 9,015,621 B2 | 4/2015 | Dean et al. | |

(56) References Cited

U.S. PATENT DOCUMENTS

| | | |
|---|---|---|
| 9,015,624 B2 | 4/2015 | Radtke et al. |
| 9,046,983 B2 | 6/2015 | Zhao et al. |
| 9,098,473 B2 | 8/2015 | Dukhon et al. |
| 9,098,837 B2 | 8/2015 | Hill et al. |
| 9,223,477 B2 | 12/2015 | Harris et al. |
| 2001/0032220 A1 | 10/2001 | Van Hoff ................. 707/513 |
| 2001/0034762 A1 | 10/2001 | Jacobs et al. |
| 2001/0035882 A1 | 11/2001 | Stoakley et al. ........... 715/779 |
| 2001/0038395 A1 | 11/2001 | Holtzblatt et al. |
| 2001/0040627 A1 | 11/2001 | Obradovich |
| 2001/0044736 A1 | 11/2001 | Jacobs et al. |
| 2001/0044741 A1 | 11/2001 | Jacobs et al. |
| 2001/0049677 A1 | 12/2001 | Talib et al. .................... 707/3 |
| 2002/0007380 A1 | 1/2002 | Bauchot et al. ............ 707/530 |
| 2002/0024638 A1 | 2/2002 | Hidari et al. |
| 2002/0029247 A1 | 3/2002 | Kawamoto ................. 709/206 |
| 2002/0037754 A1 | 3/2002 | Hama et al. ............... 455/566 |
| 2002/0052721 A1 | 5/2002 | Ruff et al. ...................... 703/1 |
| 2002/0052880 A1 | 5/2002 | Fruensgaard et al. ..... 707/104.1 |
| 2002/0052916 A1 | 5/2002 | Kloba et al. |
| 2002/0054101 A1 | 5/2002 | Beatty |
| 2002/0054128 A1 | 5/2002 | Lau et al. |
| 2002/0063734 A1 | 5/2002 | Khalfay et al. |
| 2002/0070977 A1 | 6/2002 | Morcos et al. ............ 345/810 |
| 2002/0073091 A1 | 6/2002 | Jain et al. |
| 2002/0073156 A1 | 6/2002 | Newman |
| 2002/0075330 A1 | 6/2002 | Rosenzweig et al. ...... 345/854 |
| 2002/0078143 A1 | 6/2002 | DeBoor et al. ............ 709/203 |
| 2002/0083054 A1 | 6/2002 | Peltonen et al. .............. 707/5 |
| 2002/0089543 A1 | 7/2002 | Ostergaard et al. |
| 2002/0091697 A1 | 7/2002 | Huang et al. ............... 707/10 |
| 2002/0091739 A1 | 7/2002 | Ferlitsch .................... 707/526 |
| 2002/0097266 A1 | 7/2002 | Hachiya et al. |
| 2002/0099775 A1 | 7/2002 | Gupta et al. |
| 2002/0116208 A1 | 8/2002 | Chirnomas |
| 2002/0122071 A1 | 9/2002 | Camara et al. ............ 715/810 |
| 2002/0123984 A1 | 9/2002 | Prakash |
| 2002/0123991 A1 | 9/2002 | Asami |
| 2002/0129052 A1 | 9/2002 | Glazer et al. |
| 2002/0133557 A1 | 9/2002 | Winarski .................... 709/207 |
| 2002/0135621 A1 | 9/2002 | Angiulo et al. ........... 345/838 |
| 2002/0140731 A1 | 10/2002 | Subramaniam et al. ..... 345/762 |
| 2002/0140740 A1 | 10/2002 | Chen ......................... 715/810 |
| 2002/0149623 A1 | 10/2002 | West et al. ................. 345/765 |
| 2002/0149629 A1 | 10/2002 | Craycroft et al. .......... 345/861 |
| 2002/0154178 A1 | 10/2002 | Barnett et al. ............. 715/853 |
| 2002/0158876 A1 | 10/2002 | Janssen ...................... 345/504 |
| 2002/0163538 A1 | 11/2002 | Shteyn ...................... 345/752 |
| 2002/0175938 A1 | 11/2002 | Hackworth ................ 345/751 |
| 2002/0175955 A1 | 11/2002 | Gourdol et al. ........... 345/821 |
| 2002/0186257 A1 | 12/2002 | Cadiz et al. ............... 345/838 |
| 2002/0188515 A1 | 12/2002 | Nakata et al. |
| 2002/0196293 A1 | 12/2002 | Suppan et al. ............. 345/853 |
| 2003/0005051 A1 | 1/2003 | Gottlieb |
| 2003/0005056 A1 | 1/2003 | Yamamoto et al. |
| 2003/0009455 A1 | 1/2003 | Carlson et al. ................ 707/6 |
| 2003/0011564 A1 | 1/2003 | Ushino et al. |
| 2003/0011638 A1 | 1/2003 | Chung ........................ 345/808 |
| 2003/0011639 A1 | 1/2003 | Webb ......................... 715/808 |
| 2003/0014421 A1 | 1/2003 | Jung .......................... 707/102 |
| 2003/0014490 A1 | 1/2003 | Bates et al. ................ 709/206 |
| 2003/0016248 A1 | 1/2003 | Hayes Ubillos |
| 2003/0022700 A1 | 1/2003 | Wang ......................... 455/566 |
| 2003/0025732 A1 | 2/2003 | Prichard .................... 345/765 |
| 2003/0025737 A1 | 2/2003 | Breinberg |
| 2003/0028560 A1 | 2/2003 | Kudrolli et al. |
| 2003/0035917 A1 | 2/2003 | Hyman ....................... 428/67 |
| 2003/0038832 A1 | 2/2003 | Sobol ........................ 715/722 |
| 2003/0043200 A1 | 3/2003 | Faieta et al. ............... 345/804 |
| 2003/0043211 A1 | 3/2003 | Kremer et al. ............ 715/838 |
| 2003/0046528 A1 | 3/2003 | Haitani et al. .................. 713/2 |
| 2003/0050986 A1 | 3/2003 | Matthews et al. |
| 2003/0064707 A1 | 4/2003 | Yoneyama |
| 2003/0066025 A1 | 4/2003 | Garner et al. ............. 715/500 |
| 2003/0069892 A1 | 4/2003 | Hind et al. |
| 2003/0069900 A1 | 4/2003 | Hind et al. |
| 2003/0070143 A1 | 4/2003 | Maslov ....................... 715/513 |
| 2003/0084035 A1 | 5/2003 | Emerick ........................ 707/3 |
| 2003/0093490 A1 | 5/2003 | Yamamoto et al. ......... 709/213 |
| 2003/0097361 A1 | 5/2003 | Huang et al. ................. 707/10 |
| 2003/0097640 A1 | 5/2003 | Abrams et al. ............. 715/530 |
| 2003/0098891 A1 | 5/2003 | Molander .................. 715/841 |
| 2003/0106024 A1 | 6/2003 | Silverbrook et al. ........ 715/515 |
| 2003/0110191 A1 | 6/2003 | Handsaker et al. ......... 707/503 |
| 2003/0112278 A1 | 6/2003 | Driskell ...................... 715/788 |
| 2003/0128243 A1 | 7/2003 | Okamoto |
| 2003/0132972 A1 | 7/2003 | Pang |
| 2003/0135825 A1 | 7/2003 | Gertner et al. ............. 715/513 |
| 2003/0154254 A1 | 8/2003 | Awasthi |
| 2003/0156140 A1 | 8/2003 | Watanabe .................. 345/810 |
| 2003/0160821 A1 | 8/2003 | Yoon .......................... 345/762 |
| 2003/0163455 A1 | 8/2003 | Dettinger et al. .............. 707/3 |
| 2003/0163537 A1* | 8/2003 | Rohall et al. ............... 709/206 |
| 2003/0167310 A1 | 9/2003 | Moody et al. ............. 709/206 |
| 2003/0169284 A1 | 9/2003 | Dettinger et al. .......... 715/708 |
| 2003/0177190 A1 | 9/2003 | Moody et al. |
| 2003/0187586 A1 | 10/2003 | Katzenmaier et al. |
| 2003/0195937 A1 | 10/2003 | Kircher et al. ............. 709/207 |
| 2003/0200267 A1 | 10/2003 | Garrigues |
| 2003/0206646 A1 | 11/2003 | Brackett ..................... 382/128 |
| 2003/0218611 A1 | 11/2003 | Ben-Tovim et al. ......... 345/440 |
| 2003/0220138 A1 | 11/2003 | Walker et al. |
| 2003/0226106 A1 | 12/2003 | McKellar et al. ........... 715/513 |
| 2003/0227487 A1 | 12/2003 | Hugh .......................... 715/777 |
| 2003/0229668 A1 | 12/2003 | Malik |
| 2003/0229673 A1 | 12/2003 | Malik |
| 2003/0233419 A1 | 12/2003 | Beringer .................... 709/206 |
| 2004/0002941 A1 | 1/2004 | Thorne et al. |
| 2004/0003351 A1 | 1/2004 | Sommerer et al. ......... 715/251 |
| 2004/0006570 A1 | 1/2004 | Gelb et al. ................. 707/102 |
| 2004/0010513 A1 | 1/2004 | Scherr et al. |
| 2004/0012633 A1 | 1/2004 | Helt ........................... 715/764 |
| 2004/0021647 A1 | 2/2004 | Iwema et al. |
| 2004/0024824 A1 | 2/2004 | Ferguson et al. |
| 2004/0030993 A1 | 2/2004 | Hong Huey et al. |
| 2004/0044735 A1 | 3/2004 | Hoblit ........................ 709/206 |
| 2004/0056894 A1 | 3/2004 | Zaika et al. ................ 345/762 |
| 2004/0061713 A1 | 4/2004 | Jennings |
| 2004/0068695 A1* | 4/2004 | Daniell et al. .............. 715/513 |
| 2004/0073503 A1 | 4/2004 | Morales et al. |
| 2004/0083432 A1 | 4/2004 | Kawamura et al. ......... 715/526 |
| 2004/0088359 A1 | 5/2004 | Simpson |
| 2004/0090315 A1 | 5/2004 | Mackjust et al. ........ 340/426.13 |
| 2004/0093290 A1 | 5/2004 | Doss et al. |
| 2004/0100504 A1 | 5/2004 | Sommer .................... 345/810 |
| 2004/0100505 A1 | 5/2004 | Cazier ........................ 345/811 |
| 2004/0107197 A1 | 6/2004 | Shen et al. ..................... 707/9 |
| 2004/0109025 A1 | 6/2004 | Hullot et al. ............... 345/764 |
| 2004/0109033 A1 | 6/2004 | Vienneau et al. .......... 345/863 |
| 2004/0117451 A1 | 6/2004 | Chung ....................... 709/207 |
| 2004/0119755 A1 | 6/2004 | Guibourge |
| 2004/0119760 A1 | 6/2004 | Grossman et al. .......... 715/854 |
| 2004/0122789 A1 | 6/2004 | Ostertag et al. |
| 2004/0125142 A1 | 7/2004 | Mock et al. ................ 345/765 |
| 2004/0128275 A1 | 7/2004 | Moehrle ........................ 707/1 |
| 2004/0133854 A1 | 7/2004 | Black ......................... 715/517 |
| 2004/0135811 A1 | 7/2004 | Pickering et al. |
| 2004/0142720 A1 | 7/2004 | Smethers .................. 455/550.1 |
| 2004/0153968 A1 | 8/2004 | Ching et al. ............... 715/513 |
| 2004/0153973 A1 | 8/2004 | Horwitz |
| 2004/0164983 A1 | 8/2004 | Khozai ....................... 345/440 |
| 2004/0168153 A1 | 8/2004 | Marvin ....................... 717/120 |
| 2004/0186775 A1 | 9/2004 | Margiloff et al. ............ 705/14 |
| 2004/0189694 A1 | 9/2004 | Kurtz et al. |
| 2004/0192440 A1 | 9/2004 | Evans et al. |
| 2004/0196309 A1 | 10/2004 | Hawkins |
| 2004/0205536 A1 | 10/2004 | Newman et al. |
| 2004/0212640 A1 | 10/2004 | Mann |
| 2004/0215612 A1 | 10/2004 | Brody ............................ 707/3 |
| 2004/0221234 A1 | 11/2004 | Imai ........................... 715/256 |
| 2004/0221309 A1 | 11/2004 | Zaner et al. |
| 2004/0230508 A1 | 11/2004 | Minnis et al. ................. 705/35 |
| 2004/0230906 A1 | 11/2004 | Pik et al. .................... 715/522 |
| 2004/0236796 A1 | 11/2004 | Bhatt et al. |

(56) References Cited

U.S. PATENT DOCUMENTS

| | | | |
|---|---|---|---|
| 2004/0239700 A1 | 12/2004 | Baschy | 715/781 |
| 2004/0243938 A1 | 12/2004 | Weise et al. | 715/205 |
| 2004/0254928 A1 | 12/2004 | Vronay | |
| 2004/0260756 A1 | 12/2004 | Forstall et al. | |
| 2004/0261013 A1 | 12/2004 | Wynn et al. | 715/511 |
| 2004/0268231 A1 | 12/2004 | Tunning | 715/513 |
| 2004/0268235 A1 | 12/2004 | Wason | |
| 2004/0268270 A1 | 12/2004 | Hill et al. | 715/963 |
| 2005/0004989 A1 | 1/2005 | Satterfield et al. | 709/206 |
| 2005/0004990 A1 | 1/2005 | Durazo et al. | 709/206 |
| 2005/0005235 A1 | 1/2005 | Satterfield et al. | 715/519 |
| 2005/0005249 A1 | 1/2005 | Hill et al. | 715/963 |
| 2005/0010871 A1 | 1/2005 | Ruthfield et al. | 715/712 |
| 2005/0015361 A1 | 1/2005 | Payton et al. | |
| 2005/0015364 A1 | 1/2005 | Payton | |
| 2005/0021504 A1 | 1/2005 | Atchison | 707/3 |
| 2005/0021521 A1 | 1/2005 | Wycoff | |
| 2005/0022116 A1 | 1/2005 | Bowman et al. | 715/513 |
| 2005/0027779 A1 | 2/2005 | Schinner | 709/200 |
| 2005/0033614 A1 | 2/2005 | Lettovsky et al. | 705/5 |
| 2005/0039142 A1 | 2/2005 | Jalon et al. | 715/823 |
| 2005/0043015 A1 | 2/2005 | Muramatsu | 455/412.1 |
| 2005/0044500 A1 | 2/2005 | Orimoto et al. | 715/706 |
| 2005/0055449 A1 | 3/2005 | Rappold, III | 709/228 |
| 2005/0057584 A1 | 3/2005 | Gruen et al. | 715/752 |
| 2005/0060337 A1 | 3/2005 | Chou et al. | |
| 2005/0071242 A1 | 3/2005 | Allen et al. | |
| 2005/0086135 A1 | 4/2005 | Lu | 705/30 |
| 2005/0091576 A1 | 4/2005 | Relyea et al. | |
| 2005/0097465 A1 | 5/2005 | Giesen et al. | 715/700 |
| 2005/0108348 A1 | 5/2005 | Lee | |
| 2005/0114778 A1 | 5/2005 | Branson et al. | 715/711 |
| 2005/0117179 A1 | 6/2005 | Ito et al. | 358/1.15 |
| 2005/0132010 A1 | 6/2005 | Muller | |
| 2005/0132053 A1 | 6/2005 | Roth et al. | 709/227 |
| 2005/0138552 A1 | 6/2005 | Venolia | 715/526 |
| 2005/0138576 A1 | 6/2005 | Baumert et al. | 715/862 |
| 2005/0144157 A1 | 6/2005 | Moody et al. | 707/3 |
| 2005/0144241 A1 | 6/2005 | Stata et al. | |
| 2005/0144284 A1 | 6/2005 | Ludwig et al. | 709/226 |
| 2005/0144560 A1 | 6/2005 | Gruen et al. | |
| 2005/0144568 A1* | 6/2005 | Gruen et al. | 715/822 |
| 2005/0144572 A1 | 6/2005 | Wattenberg et al. | 715/822 |
| 2005/0172262 A1 | 8/2005 | Lalwani | 717/109 |
| 2005/0177789 A1 | 8/2005 | Abbar et al. | 705/528 |
| 2005/0183008 A1 | 8/2005 | Crider et al. | 715/517 |
| 2005/0185920 A1 | 8/2005 | Harper et al. | |
| 2005/0188043 A1 | 8/2005 | Cortright et al. | 709/206 |
| 2005/0203975 A1 | 9/2005 | Jindal et al. | 707/204 |
| 2005/0216863 A1 | 9/2005 | Schumacher et al. | 715/827 |
| 2005/0222985 A1 | 10/2005 | Buchheit et al. | |
| 2005/0223057 A1 | 10/2005 | Buchheit et al. | |
| 2005/0223066 A1 | 10/2005 | Buchheit et al. | |
| 2005/0223329 A1 | 10/2005 | Schwartz et al. | 715/711 |
| 2005/0234910 A1 | 10/2005 | Buchheit et al. | |
| 2005/0240902 A1 | 10/2005 | Bunker et al. | |
| 2005/0251757 A1 | 11/2005 | Farn | |
| 2005/0256867 A1 | 11/2005 | Walther et al. | 707/5 |
| 2005/0278656 A1 | 12/2005 | Goldthwaite et al. | 715/810 |
| 2005/0289109 A1 | 12/2005 | Arrouye et al. | 707/1 |
| 2005/0289156 A1 | 12/2005 | Maryka et al. | 707/100 |
| 2005/0289158 A1 | 12/2005 | Weiss et al. | |
| 2006/0015816 A1 | 1/2006 | Kuehner et al. | 715/744 |
| 2006/0020962 A1 | 1/2006 | Stark | 725/32 |
| 2006/0026033 A1 | 2/2006 | Brydon et al. | 705/1 |
| 2006/0026145 A1 | 2/2006 | Beringer et al. | |
| 2006/0026213 A1 | 2/2006 | Yaskin et al. | 707/200 |
| 2006/0026242 A1 | 2/2006 | Kuhlmann et al. | |
| 2006/0036580 A1 | 2/2006 | Stata | 707/3 |
| 2006/0036945 A1 | 2/2006 | Radtke et al. | 715/708 |
| 2006/0036946 A1 | 2/2006 | Radtke et al. | 715/711 |
| 2006/0036950 A1 | 2/2006 | Himberger et al. | 715/732 |
| 2006/0036964 A1 | 2/2006 | Satterfield et al. | 715/777 |
| 2006/0036965 A1 | 2/2006 | Harris et al. | 715/777 |
| 2006/0041545 A1 | 2/2006 | Heidloff et al. | 707/4 |
| 2006/0047644 A1 | 3/2006 | Bocking et al. | |
| 2006/0053383 A1 | 3/2006 | Gauthier et al. | |
| 2006/0064434 A1 | 3/2006 | Gilbert et al. | 707/104.1 |
| 2006/0069604 A1 | 3/2006 | Leukart et al. | 705/9 |
| 2006/0069686 A1 | 3/2006 | Beyda et al. | 707/10 |
| 2006/0074844 A1 | 4/2006 | Frankel et al. | |
| 2006/0080303 A1 | 4/2006 | Sargent et al. | 707/3 |
| 2006/0085502 A1 | 4/2006 | Sundararajan et al. | |
| 2006/0095865 A1 | 5/2006 | Rostom | 715/810 |
| 2006/0101051 A1 | 5/2006 | Carr et al. | 707/102 |
| 2006/0101350 A1 | 5/2006 | Scott | 715/779 |
| 2006/0111931 A1 | 5/2006 | Johnson et al. | 705/1 |
| 2006/0117249 A1 | 6/2006 | Hu et al. | 715/255 |
| 2006/0117302 A1 | 6/2006 | Mercer et al. | 717/131 |
| 2006/0129937 A1 | 6/2006 | Shafron | 715/733 |
| 2006/0132812 A1 | 6/2006 | Barnes et al. | 358/1.11 |
| 2006/0155689 A1 | 7/2006 | Blakeley et al. | 707/3 |
| 2006/0161849 A1* | 7/2006 | Miller et al. | 715/744 |
| 2006/0161863 A1 | 7/2006 | Gallo | 715/810 |
| 2006/0168522 A1 | 7/2006 | Bala | |
| 2006/0173824 A1 | 8/2006 | Bensky | 707/3 |
| 2006/0173961 A1 | 8/2006 | Turski et al. | |
| 2006/0200455 A1 | 9/2006 | Wilson | |
| 2006/0218500 A1 | 9/2006 | Sauve et al. | 715/767 |
| 2006/0242557 A1 | 10/2006 | Nortis III | 715/234 |
| 2006/0242575 A1 | 10/2006 | Winser | 715/530 |
| 2006/0248012 A1 | 11/2006 | Kircher et al. | 705/50 |
| 2006/0259449 A1 | 11/2006 | Betz et al. | 707/1 |
| 2006/0271869 A1 | 11/2006 | Thanu et al. | 715/764 |
| 2006/0271910 A1 | 11/2006 | Burcham et al. | |
| 2006/0282817 A1 | 12/2006 | Darst et al. | |
| 2006/0294452 A1 | 12/2006 | Matsumoto | 715/236 |
| 2006/0294526 A1 | 12/2006 | Hambrick et al. | 719/315 |
| 2007/0006206 A1 | 1/2007 | Dhanjal et al. | 717/168 |
| 2007/0011258 A1 | 1/2007 | Khoo | |
| 2007/0033250 A1 | 2/2007 | Levin et al. | |
| 2007/0050182 A1 | 3/2007 | Sneddon et al. | 704/2 |
| 2007/0050401 A1 | 3/2007 | Young et al. | 707/102 |
| 2007/0055936 A1 | 3/2007 | Dhanjal et al. | |
| 2007/0055943 A1 | 3/2007 | McCormack et al. | 715/746 |
| 2007/0061306 A1 | 3/2007 | Pell et al. | 707/3 |
| 2007/0061307 A1 | 3/2007 | Hartwell et al. | 707/3 |
| 2007/0061308 A1 | 3/2007 | Hartwell et al. | 707/3 |
| 2007/0094230 A1 | 4/2007 | Subramaniam et al. | |
| 2007/0101299 A1 | 5/2007 | Shaw et al. | |
| 2007/0106951 A1 | 5/2007 | McCormack et al. | 715/764 |
| 2007/0124696 A1 | 5/2007 | Mullender | |
| 2007/0130276 A1 | 6/2007 | Zhang et al. | |
| 2007/0143662 A1 | 6/2007 | Carlson et al. | 715/507 |
| 2007/0143671 A1 | 6/2007 | Paterson et al. | 715/209 |
| 2007/0180040 A1 | 8/2007 | Etgen et al. | 709/207 |
| 2007/0185826 A1 | 8/2007 | Brice et al. | 707/1 |
| 2007/0203991 A1 | 8/2007 | Fisher et al. | |
| 2007/0240057 A1 | 10/2007 | Satterfield et al. | 715/705 |
| 2007/0260996 A1 | 11/2007 | Jakobson | 715/781 |
| 2007/0266017 A1 | 11/2007 | Held et al. | |
| 2007/0279417 A1 | 12/2007 | Garg et al. | 345/440 |
| 2007/0282956 A1 | 12/2007 | Staats | 709/206 |
| 2007/0300168 A1 | 12/2007 | Bosma et al. | 715/820 |
| 2008/0005247 A9 | 1/2008 | Khoo | |
| 2008/0005249 A1 | 1/2008 | Hart | |
| 2008/0005686 A1 | 1/2008 | Singh | |
| 2008/0034304 A1 | 2/2008 | Feuerbacher et al. | 715/764 |
| 2008/0040682 A1 | 2/2008 | Sorenson et al. | 715/777 |
| 2008/0046518 A1 | 2/2008 | Tonnison et al. | |
| 2008/0052670 A1 | 2/2008 | Espinosa et al. | |
| 2008/0077571 A1 | 3/2008 | Harris et al. | 707/5 |
| 2008/0098229 A1 | 4/2008 | Hartrell et al. | |
| 2008/0104505 A1 | 5/2008 | Keohane et al. | 715/246 |
| 2008/0109787 A1 | 5/2008 | Wang et al. | |
| 2008/0134138 A1 | 6/2008 | Chamieh et al. | 717/105 |
| 2008/0141242 A1 | 6/2008 | Shapiro | 717/174 |
| 2008/0155555 A1 | 6/2008 | Kwong | 719/315 |
| 2008/0168146 A1 | 7/2008 | Fletcher | |
| 2008/0178110 A1 | 7/2008 | Hill et al. | 715/771 |
| 2008/0216014 A1 | 9/2008 | Kurtenbach et al. | |
| 2008/0244440 A1 | 10/2008 | Bailey et al. | |
| 2009/0007003 A1 | 1/2009 | Dukhon et al. | 715/778 |
| 2009/0012984 A1 | 1/2009 | Ravid et al. | 707/101 |

(56) References Cited

U.S. PATENT DOCUMENTS

| | | | |
|---|---|---|---|
| 2009/0083656 A1 | 3/2009 | Dukhon et al. | 715/781 |
| 2009/0100009 A1 | 4/2009 | Karp | |
| 2009/0106375 A1 | 4/2009 | Carmel et al. | 709/206 |
| 2009/0144651 A1 | 6/2009 | Sprang et al. | |
| 2009/0152349 A1 | 6/2009 | Bonev et al. | |
| 2009/0158173 A1 | 6/2009 | Palahnuk et al. | |
| 2009/0192845 A1 | 7/2009 | Gudipaty et al. | |
| 2009/0217192 A1 | 8/2009 | Dean et al. | 715/777 |
| 2009/0222763 A1 | 9/2009 | Dukhon et al. | 715/808 |
| 2009/0319619 A1 | 12/2009 | Affronti et al. | |
| 2009/0319911 A1 | 12/2009 | Mccann et al. | |
| 2010/0011310 A1 | 1/2010 | Rainisto | |
| 2010/0060645 A1 | 3/2010 | Garg et al. | 345/440 |
| 2010/0159967 A1 | 6/2010 | Pounds et al. | |
| 2010/0180226 A1 | 7/2010 | Satterfield et al. | 715/777 |
| 2010/0191818 A1 | 7/2010 | Satterfield et al. | 709/206 |
| 2010/0199261 A1 | 8/2010 | Shenfield et al. | |
| 2010/0211889 A1 | 8/2010 | Durazo et al. | 715/752 |
| 2010/0223575 A1 | 9/2010 | Leukart et al. | 715/779 |
| 2010/0293470 A1 | 11/2010 | Zhao et al. | |
| 2011/0055673 A1 | 3/2011 | Teng et al. | |
| 2011/0055690 A1 | 3/2011 | Wason | |
| 2011/0072396 A1 | 3/2011 | Giesen et al. | 715/841 |
| 2011/0138273 A1 | 6/2011 | Radtke et al. | 715/256 |
| 2011/0225249 A1 | 9/2011 | Forstall et al. | |
| 2011/0296322 A1 | 12/2011 | Dhanjal et al. | 715/760 |
| 2012/0179993 A1 | 7/2012 | Himberger et al. | |
| 2012/0215866 A1 | 8/2012 | Satterfield et al. | |
| 2012/0324394 A1 | 12/2012 | Harris et al. | |
| 2013/0014048 A1 | 1/2013 | Satterfield et al. | |
| 2013/0159879 A1 | 6/2013 | Affronti et al. | |
| 2013/0283207 A1 | 10/2013 | Dukhon et al. | |
| 2013/0305141 A1 | 11/2013 | Wason | |
| 2014/0115526 A1 | 4/2014 | Hartwell et al. | |
| 2014/0132609 A1 | 5/2014 | Garg et al. | |
| 2014/0258933 A1 | 9/2014 | Dukhon et al. | |
| 2015/0220263 A1 | 8/2015 | Zhao et al. | |
| 2015/0309679 A1 | 10/2015 | Dean et al. | |
| 2015/0339281 A1 | 11/2015 | Dukhon et al. | |
| 2015/0370771 A1 | 12/2015 | Dukhon et al. | |
| 2016/0117069 A1 | 4/2016 | Harris et al. | |

FOREIGN PATENT DOCUMENTS

| | | | |
|---|---|---|---|
| CA | 2 650 016 | 9/2014 | |
| CA | 2512036 | 11/2015 | |
| CN | 1553377 | 12/2004 | |
| CN | 1746914 | 3/2006 | |
| CN | 1755599 A | 4/2006 | |
| CN | 101243439 | 6/2012 | |
| CN | 102067166 | 6/2013 | |
| CN | 102317897 | 7/2013 | |
| CN | 102077163 | 10/2013 | |
| CN | 102077199 B | 1/2014 | |
| CN | 201080021957.4 | 11/2014 | |
| EP | 0 584 269 B1 | 3/1994 | |
| EP | 0851368 A2 | 7/1998 | |
| EP | 0 910 007 | 4/1999 | |
| EP | 1 077 405 A2 | 2/2001 | |
| EP | 1 104 151 | 5/2001 | |
| EP | 1 672 518 | 6/2001 | |
| EP | 1 223 503 | 7/2002 | |
| EP | 1 376 337 | 2/2004 | |
| EP | 1 462 999 A2 | 9/2004 | |
| EP | 1 542 133 A2 | 6/2005 | |
| EP | 1 564 652 | 8/2005 | |
| EP | 1 628 197 | 2/2006 | |
| EP | 1 628 198 | 2/2006 | |
| EP | 1 628 199 | 2/2006 | |
| EP | 1 645 972 | 4/2006 | |
| EP | 1 835 434 A1 | 9/2007 | |
| EP | 1 915 001 | 4/2008 | |
| GB | 2329813 | 3/1999 | |
| GB | 2 382 683 A | 6/2003 | |
| GB | 2 391 148 | 1/2004 | |
| ID | P 0027717 | 3/2011 | |
| ID | P 0027754 | 3/2011 | |
| ID | P 0029297 | 10/2011 | |
| JP | 03-043824 | 2/1991 | |
| JP | 04-186425 | 3/1992 | |
| JP | 04-312186 | 11/1992 | |
| JP | 05-204579 | 8/1993 | |
| JP | 06-052282 | 2/1994 | |
| JP | 06-342357 | 12/1994 | |
| JP | 09-204289 | 8/1997 | |
| JP | 10-074217 | 3/1998 | |
| JP | 10-326171 | 12/1998 | |
| JP | 11-039292 | 2/1999 | |
| JP | 11-175258 | 7/1999 | |
| JP | 11-259200 | 9/1999 | |
| JP | 2000-353130 A | 12/2000 | |
| JP | 2001-034775 | 2/2001 | |
| JP | 2001-503893 | 3/2001 | |
| JP | 2001-109673 | 4/2001 | |
| JP | 2001-222477 | 8/2001 | |
| JP | 2001-337944 | 12/2001 | |
| JP | 2002-324055 A | 11/2002 | |
| JP | 2003-015719 | 1/2003 | |
| JP | 2003-101768 | 4/2003 | |
| JP | 2003-198630 | 7/2003 | |
| JP | 2003-216427 | 7/2003 | |
| JP | 2003-0072539 A | 9/2003 | |
| JP | 2003-256258 | 9/2003 | |
| JP | 2003-256302 | 9/2003 | |
| JP | 2003-526820 | 9/2003 | |
| JP | 2003-308145 | 10/2003 | |
| JP | 2003-316630 | 11/2003 | |
| JP | 2004-078512 | 3/2004 | G06F 17/30 |
| JP | 2004-086893 | 3/2004 | |
| JP | 2004-102803 | 4/2004 | G06F 17/30 |
| JP | 2004-512578 | 4/2004 | |
| JP | 2004-145569 | 5/2004 | G06F 17/21 |
| JP | 2004-159261 | 6/2004 | |
| JP | 2004-159261 A | 6/2004 | |
| JP | 2004-185464 | 7/2004 | |
| JP | 2004-318842 | 11/2004 | |
| JP | 2004-342115 | 12/2004 | |
| JP | 2005-025550 | 1/2005 | |
| JP | 2005-31995 | 2/2005 | |
| JP | 2005-032041 | 2/2005 | |
| JP | 2005-115914 A | 5/2005 | |
| JP | 2005-182353 | 7/2005 | G06F 17/30 |
| JP | 2005-236089 | 9/2005 | |
| JP | 2005-352849 | 12/2005 | |
| JP | 2006-059358 | 3/2006 | |
| JP | 2007-280180 | 10/2007 | |
| JP | 2007-531165 | 11/2007 | |
| JP | 2008-047067 | 2/2008 | |
| JP | 2008-117019 A | 5/2008 | |
| JP | 2009-507311 | 2/2009 | |
| JP | 4832024 | 9/2011 | |
| JP | 5021185 | 6/2012 | |
| JP | 5079701 | 9/2012 | |
| JP | 5139984 | 11/2012 | |
| JP | 5190452 | 2/2013 | |
| JP | 5193042 | 2/2013 | |
| JP | 5221757 | 3/2013 | |
| JP | 5266384 | 5/2013 | |
| JP | 5480894 | 2/2014 | |
| JP | 5486595 | 2/2014 | |
| JP | 5559817 | 6/2014 | |
| JP | 5559845 | 6/2014 | |
| JP | 5597698 | 8/2014 | |
| KR | 10-2001-0091344 A | 10/2001 | |
| KR | 10-0359378 | 10/2002 | |
| KR | 10-2003-0070685 | 2/2003 | |
| KR | 10-0388254 B1 | 6/2003 | |
| KR | 10-2004-0071813 | 8/2004 | |
| KR | 10-2005-0023805 A | 3/2005 | |
| KR | 10-2005-0036702 A | 4/2005 | |
| KR | 10-2006-0000506 | 1/2007 | |
| KR | 10-2007-0000506 | 1/2007 | |
| KR | 10-2008-0041234 | 5/2008 | |
| KR | 10-1130421 | 3/2012 | |

(56) References Cited

FOREIGN PATENT DOCUMENTS

| | | | |
|---|---|---|---|
| KR | 10-1149960 | 5/2012 | |
| KR | 10-1149990 | 5/2012 | |
| KR | 10-1159334 | 6/2012 | |
| KR | 10-1238559 | 2/2013 | |
| KR | 10-1298338 | 8/2013 | |
| KR | 10-1298461 | 8/2013 | |
| KR | 10-1312867 | 9/2013 | |
| KR | 10-1323011 | 10/2013 | |
| MX | 315932 | 12/2013 | |
| MX | 322458 | 4/2014 | |
| MX | 323275 | 9/2014 | |
| MX | 323276 | 9/2014 | |
| MY | 146456 | 8/2012 | |
| MY | 147334 | 7/2013 | |
| MY | 149803 | 10/2013 | |
| PH | 1-2005-000404 | 8/2011 | |
| PH | 1-2005-000495 | 3/2014 | |
| PH | 1-2008-500356 | 8/2014 | |
| RU | 2005-116667 | 11/2006 | |
| RU | 2005-120362 | 1/2007 | |
| RU | 2005-130357 | 4/2007 | |
| RU | 2322687 | 4/2008 | |
| RU | 2327205 C2 | 6/2008 | |
| RU | 2328034 | 6/2008 | |
| RU | 2332728 C2 | 8/2008 | |
| RU | 2001-122576 A | 7/2014 | |
| RU | 2537776 | 1/2015 | |
| TW | 420953 | 2/2001 | |
| TW | 460839 | 10/2001 | |
| TW | 490652 | 6/2002 | |
| TW | 527812 | 4/2003 | |
| TW | 2003-05097 | 10/2003 | |
| TW | 569122 | 1/2004 | |
| TW | 200514018 A | 4/2005 | |
| TW | I254878 | 5/2006 | |
| TW | 2008-14632 | 3/2008 | |
| TW | I368852 | 7/2012 | |
| TW | I389002 | 3/2013 | |
| TW | I389043 | 3/2013 | |
| TW | I401577 | 7/2013 | |
| TW | I512591 | 12/2015 | |
| WO | 92/21091 | 11/1992 | |
| WO | 94-20921 | 9/1994 | |
| WO | 96/10231 | 4/1996 | |
| WO | 96-39654 | 12/1996 | |
| WO | 98/20410 | 5/1998 | |
| WO | WO 99/04353 | 1/1999 | |
| WO | WO 99/04353 A1 | 1/1999 | G06F 17/60 |
| WO | WO 99/27495 | 6/1999 | |
| WO | WO 01/55894 | 8/2001 | |
| WO | WO 02/091162 A3 | 11/2002 | |
| WO | WO 03/003240 A2 | 1/2003 | |
| WO | WO 03/058519 A2 | 7/2003 | |
| WO | WO 03/098500 | 11/2003 | |
| WO | WO 2004/027672 | 4/2004 | |
| WO | WO 2004/056250 A1 | 10/2004 | |
| WO | 2007-030727 A3 | 3/2007 | |
| WO | WO 2007/033159 A1 | 3/2007 | |
| WO | 2007/036762 A1 | 4/2007 | |
| WO | WO 2007/027737 A1 | 8/2007 | |
| WO | 2008/027477 | 3/2008 | |
| WO | WO 2008/121718 A1 | 10/2008 | |
| WO | 2009-158151 | 12/2009 | |
| WO | 2009-158171 | 12/2009 | |
| WO | 2009-158172 | 12/2009 | |
| ZA | 2010/07809 | 2/2012 | |
| ZA | 2010/07810 | 2/2012 | |
| ZA | 2010/07875 | 2/2012 | |
| ZA | 2011/04850 | 12/2012 | |

OTHER PUBLICATIONS

Randolph Hock; Yahoo! to the Max; May 10, 2005; 5 excerpted pages.*
Homeworking Forum; archived Dec. 6, 2004; 11 pages.*
"*NEO Pro—the total "find that email" solution!* "; http://www.caelo.com/products/learn/, Sep. 15, 2009.
"*VisNetic MailFlow*"; http://www.deerfield.com/products/visnetic-mailflow/, Sep. 15, 2009.
U.S. Appl. No. 09/084,729, filed May 26, 1998 entitled "System and Method for Using a Client Database to Manage Conversation Threads Generated from Email or News Messages".
U.S. Appl. No. 10/848,774, filed May 19, 2004 entitled "Automatic Grouping of Electronic Mail".
U.S. Appl. No. 12/144,642, filed Jun. 24, 2008 entitled "Automatic Conversation Techniques".
U.S. Appl. No. 12/142,927, filed Jun. 20, 2008 entitled "Synchronized Conversation-Centric Message List and Message Reading Pane".
International Search Report mailed Nov. 20, 2009, Application No. PCT/US2009/044059.
International Search Report mailed Dec. 24, 2009, Application No. PCT/US2009/044292.
U.S. Official Action dated Apr. 23, 2010 cited in U.S. Appl. No. 12/144,642.
U.S. Official Action dated Sep. 16, 2010 cited in U.S. Appl. No. 12/144,642.
"Look and Layout", retrieved at <<http://liv.ac.uk/csd/email/outlook/layout.htm>>, University of Liverpool, 9 pgs, retrieved Mar. 3, 2008.
"Preview Pane on Conversation: 4 Pane View", 2005, Zimbra Inc., 3 pgs.
"Reading Pane in Conversation View", retrieved at <<http://www.zimbra.com/forums/users/5918-reading-pane-conversation-view.html>>, 5 pgs, retrieved Mar. 3, 2008.
Mock, et al., "An Experimental Framework for Email Categorization and Management", Sep. 9-12, 2001, 3 pgs.
Yang, et al., "Email Categorization Using Fast Machine Learning Algorithms", 2002, 8 pgs.
Islam, et al., "Email Categorization Using Multi-Stage Classification Technique", 2007, 8 pgs.
Venolla et al., "Supporting Email Workflow"; revised Dec. 2001.
U.S. Official Action dated Jan. 6, 2011 cited in U.S. Appl. No. 12/142,927 (Not at M&G).
U.S. Official Action dated Feb. 1, 2011 cited in U.S. Appl. No. 12/144,642 (Not at M&G).
Australian OA mailed Jan. 17, 2011, in AU Application No. 2006287408.
U.S. Official Action dated May 12, 2011 cited in U.S. Appl. No. 12/753,923.
Office Action mailed Jun. 10, 2011, in JP Application No. 2008-530229, w/translation.
Mexican Office Action dated Jan. 22, 2013 cited in Appln No. MX/a/2008/003342.
Mexican Office Action dated Mar. 22, 2013 in Appln No. PA/a/2005/008350.
Russian Office Action dated May 13, 2013 cited in Appln No. 2010-151922.
Korean Final Notice of Preliminary Rejection dated May 20, 2013 cited in Appln No. 10-2008-7005939.
Chinese Notice on Third Office Action dated Jun. 5, 2013 cited in Appln No. 200980124644.9.
Mexican Office Action dated Jun. 11, 2013 in Appln No. PA/a/2005/008351.
Mexican Office Action dated Jun. 20, 2013 in Appin No. MX/a/2010-014056.
U.S. Official Action dated Jun. 3, 2013 in U.S. Appl. No. 13/102,633, 29 pgs.
U.S. Official Action dated Jul. 18, 2013 in U.S. Appl. No. 10/607,020, 109 pgs.
U.S. Official Action dated Jul. 23, 2013 in U.S. Appl. No. 11/782,059, 35 pgs.
U.S. Official Action dated Jul. 24, 2013 in U.S. Appl. No. 12/142,927, 42 pgs.
Dr. Dobb's Journal; "Windows 95 Common Controls"; May 1, 1995; 12 pgs.

(56) References Cited

OTHER PUBLICATIONS

Mexican Office Action Summary, dated Sep. 22, 2011 cited in Appln. No. MX/a/2008/003342.
Japanese Notice of Rejection dated Nov. 4, 2011 cited in Appln No. 2008-513476.
Chinese Third Office Action dated Dec. 5, 2011 cited in Appln. No. 200680018095.3.
European Search Report dated Dec. 6, 2011 cited in Appln No. 06803424.8.
Japanese Notice of Rejection dated Dec. 16, 2011 cited in Appln No. 2008-529218.
U.S. Official Action dated Jan. 12, 2012 cited in U.S. Appl. No. 11/782,059.
Microsoft Office 2007 Word Help, 3 pgs.
Alexander, Keeping New Messages Marked 'Unread' (2007), http://certcities.com/editorial/colums/story.asp?EditorialsD=243, 2 pgs.
Wiley, Microsoft® Office Outlook® 2007 for Dummies®, 9 pgs.
Israeli Office Action dated Aug. 29, 2012 in Appln No. 169717.
Canadian Office Action dated Nov. 29, 2012 cited in Appln No. 2,512,036.
Russian Office Action dated Dec. 12, 2012 cited in Appln No. 2010140069.
Chinese Second Office Action dated Dec. 17, 2012 cited in Appln No. 200980124644.9
Chinese Third Office Action dated Dec. 31, 2012 in Appln No. 200980124944.7.
Chinese Second Office Action dated Dec. 31, 2012 in Appln No. 200980124945.1.
Chinese Second Office Action dated Jan. 4, 2013 in Appln No. 201080008789.5.
Chinese Office Action dated Jan. 6, 2013 in Appln No. 201080021957.4.
EP Communication dated Jan. 10, 2013 cited in Appln No. PCT/US2010/021888, 8 pgs.
Malaysian Substantitive Examination Adverse Report dated Jan. 15, 2013 in Appln No. PI 20084401, 3 pgs.
Canadian Office Action dated Jan. 18, 2013 in Appln No. 2,512,155, 6 pgs.
Mexican Office Action dated Feb. 5, 2013 cited in Appln No. MX/a/2008/014849, 8 pgs.
Chinese Office Action dated Feb. 5, 2013 cited in Appln No. 200910148820.4, 5 pgs.
U.S. Official Action dated Dec. 12, 2012 in U.S. Appl. No. 10/851,506.
U.S. Official Action dated Dec. 12, 2012 in U.S. Appl. No. 12/954,952.
U.S. Official Action dated Dec. 31, 2012 in U.S. Appl. No. 12/142,927.
Aoyagi, Hideo, "Mail Mac Fan Special 33"; Manichi Communications Inc., Mar. 1, 2004, 5 pgs.
Morita, Utako; "Literature Searching System, 'JDream'"; Online Search; vol. 23, No. 4; The Society of Japan Terminal, Dec. 2002; 5 pgs.
Milstein, Sarah; "The Missing Manual: The book that should have been in the box", First Edition; O'Reilly Japan, Inc.; Nov. 25, 2004; 1 pg.
Cole; "New Arrival! Forefront of Downloading"; Mac People; vol. 11, No. 10; ASCII Corporation; Aug. 31, 2005; 1 pg.
Sada, Morihiro; "Clue for Managing Common Data Filed on Server"; Business Personal Computer Age; vol. 15, No. 7; Dempa Publications, Inc.; Jul. 1, 1997; 1 pg.
Japanese Notice of Rejection dated Nov. 25, 2011 cited in Appln. No. 2008-531249.
Korean Notice of Rejection dated Jan. 30, 2012 cited in Appln No. 10-2004-0048176.
Japanese Notice of Rejection dated Feb. 3, 2012 cited in Appln No. 2008-530218.
U.S. Official Action dated Jan. 26, 2012 in U.S. Appl. No. 12/464,584.
U.S. Appl. No. 13/595,084, filed Aug. 27, 2012 entitled "Command User Interface for Displaying Selectable Software Functionality Controls".
Mexican Office Action Summary dated Jun. 25, 2012 in Appln No. PA/a/2005/008354.
Korean Notice of Preliminary Rejection dated Jul. 2, 2012 cited in Appln No. 10-2012-0024393.
Korean Notice of Preliminary Rejection dated Jul. 19, 2012 cited in Appln No. 10-2007-7024571.
Chinese Third Office Action dated Aug. 14, 2012 in Appln No. 200980124383.0.
U.S. Official Action dated Aug. 7, 2012 in U.S. Appl. No. 10/836,154.
U.S. Appl. No. 13/769,598, filed Feb. 18, 2013 entitled "Automatic Conversation Techniques".
Malaysian Substantive Examination Report dated Oct. 31, 2012 cited in Appln No. PI 20053260, 2 pgs.
EP Search Report dated Jan. 30, 2013 in Appln No. PCT/US2009/044059, 8 pgs.
Mexican Office Action dated Feb. 25, 2013 in Appln No. MX/a/2008/002889, 11 pgs.
U.S. Official Action dated Mar. 1, 2013 in U.S. Appl. No. 11/430,562, 66 pgs.
U.S. Official Action dated May 5, 2011 cited in U.S. Appl. No. 10/836,154.
U.S. Official Action dated May 19, 2011 cited in U.S. Appl. No. 10/851,506.
Japanese Notice of Rejection dated May 6, 2011 cited in Appln. No. 2005-236089.
Japanese Notice of Rejection dated May 6, 2011 cited in Appln. No. 2005-236087.
Korean Notice of Rejection dated May 17, 2011 cited in Appln No. 10-2004-48176.
Chinese Second Office Action dated May 19, 2011 cited in Appln No. 200780020312.7.
Russian Office Action dated Jun. 14, 2011 cited in Appln No. 2008147090.
Chinese Third Office Action dated Jun. 21, 2011 cited in Appln No. 200680030421.2.
U.S. Official Action dated May 19, 2011 in U.S. Appl. No. 11/430,562.
U.S. Official Action dated Jun. 9, 2011 in U.S. Appl. No. 12/464,584.
U.S. Official Action dated Jul. 8, 2011 in U.S. Appl. No. 11/401,470.
U.S. Official Action dated Jul. 8, 2011 in U.S. Appl. No. 12/163,784.
Redmond, Tony; Excerpt from Book; Microsoft Exchange Server 2003; Published 2003; 14 pgs.
Chinese Office Action dated Jul. 12, 2012 in Appln No. 201080008789.5.
Chinese Decision on Rejection dated Jul. 31, 2012 cited in Appln No. 200680018095.3.
Chinese Office Action dated Aug. 2, 2012 in Appln No. 200980124945.1.
U.S. Appl. No. 13/615,668, filed Sep. 14, 2012 entitled "User Interface for Displaying Selectable Software Functionality Controls that are Relevant to a Selected Object".
Malaysian Examination Report dated Aug. 30, 2012 in Appln No. PI 20080400.
Chinese Second Office Action dated Sep. 12, 2012 in Appln No. 200980124944.7.
Mexican Office Action Summary dated Sep. 18, 2012 in Appln No. MX/a/2008/003342.
Chilean Office Action dated Sep. 21, 2012 cited in Appln No. 1560-2010, w/English Language Summary.
EP Communication dated Sep. 26, 2012 cited in Appln No. PCT/US2006/034993.
U.S. Official Action dated Sep. 11, 2012 in U.S. Appl. No. 12/163,784.
U.S. Official Action dated Sep. 13, 2012 in U.S. Appl. No. 13/437,031.
Charles Rich et al., "Segmented Interaction History in a Collaborative Interface Agent," 1997, ACM, pp. 23-30.

(56) References Cited

OTHER PUBLICATIONS

Andrew Dwelly, "Functions and Dynamic User Interface," 1989, ACM, pp. 371-381.
Gordon Kurtenbach et al., "The Hotbox: Efficient Access to a Large Number of Menu-items," ACM, 1999, pp. 231-237, May 1999.
Charles Rich et al., "Adding a Collaborative Agent to Graphical User Interfaces," 1996, ACM, pp. 21-30.
Boyce, "Microsoft Outlook Inside Out," 2001, pp. 67, 68, 109, 110, 230, 231, 310, 316-318, 798.
Halvorson et al., "Microsoft Office XP Inside Out," 2001, pp. 1005-1009, 1015, 1023-1028, 1036-1039, 1093.
Riggsby et al., "Mastering Lotus Notes and Domino 6," 2003, pp. 135-139.
Riggsby et al., "Mastering Lotus Notes and Domino 6," 2003, pp. 135-138, 607-612.
Khare et al., "The Origin of (Document) Species," University of California, 1998, 9 pgs.
"Separate Structure and Presentation," http://www.webreference.com/html/tutorial5/1.html, Aug. 20, 1998, 4 pgs.
"The Style Attribute and CSS Declarations," http://www.webreference.com/html/tutorial5/2, Aug. 20, 1998, 4 pgs.
"What's Hot in Internet Services?" http://www.webreference.com/html/tutorial5/3, Aug. 20, 1998, 3 pgs.
"The Style Element & CSS Selectors," http://www.webreference.com/html/tutorial5/4.html, Aug. 20, 1998, 3 pgs.
http://www.webreference.com/html/tutorial5/5.html, Aug. 20, 1998, 3 pgs.
"ID & Class Selectors, Pseudoclasses," http://www.webreference.com/html/tutorial5/6.html, Aug. 20, 1998, 3 pgs.
http://www.webreference.com/html/tutorial5/7.html, Aug. 20, 1998, 3 pgs.
http://www.webreference.com/html/tutorial5/8.html, Aug. 20, 1998, 2 pgs.
"External Style Sheets," http://www.webreference.com/html/tutorial5/9.html, Aug. 20, 1998, 3 pgs.
Raman, "Cascaded Speech Style Sheets," 1997, 7 pgs.
"Primary Windows," Accessed at http://www-03.ibm.com/servers/eserver/iseries/navigator/guidelines/primary.html on Feb. 23, 2007, 23 pgs.
Schumaker, "User Interface Standards," http://msdn2.microsoft.com/en-us/library/aa217660(office.11.d=printer).aspx, Sep. 2001, 5 pgs.
Budinsky et al., "WebSphere Studio Overview," http://researchweb.watson.ibm.com/journal/sj/432/budinsky.html, May 6, 2004, 25 pgs.
Gordon Padwick, Using Microsoft Outlook 2000, Que, Sp. Ed., May 1999, 5 pp.
Becker et al., "Virtual Folders: Database Support for Electronic Messages Classification," Pontificia Universidade Catolica do Rio Grande do Sul, Porto Alegre, Brazil, pp. 163-170.
Goldberg et al., "Using Collaborative Filtering to Weave an Information Tapestry," Communication of the ACM, vol. 35, No. 12, pp. 61-70, Dec. 1992.
Liu et al., "Continual Queries for Internet Scale Event-Driven Information Delivery," IEEE Transactions on Knowledge and Data Engineering, vol. 11, Issue 1, pp. 610-628, 1999.
Chen et al., "NiagaraCQ: A Scalable Continuous Query System for Internet Databases," Int. Conf. on Management of Data, Proc. of the 2000 ACM SIGMOD Int. Conf. on Management of Data, pp. 379-390, 2000.
Marshall School of Business: "Workshop IV—Calendar," http://www.marshall.usc.edu/computing/PDF_Files/Outlook/Workshop4, PDF, Apr. 10, 2000, pp. 1-4.
M. Williams, "Programming Windows NT4: Unleashed," Sams Publishing, Indianapolis, 1996, pp. index & 167-185.
"Microsoft Outlook 2000: Introduction to Calendar," Version Mar. 25, 2002, http://www.uakron.edu/its/learning/training/docs/Calendar032502.pdf, Mar. 25, 2002, pp. 1-52.
Screen Dumps of Microsoft Outlook (1999, pp. 1-3).
"To-do List—effective task management software" [on line], Aug. 3, 2004, http://web.archive.org/web/20040804103245/www.htpshareware.com/todolist/changes.txt and http://web.archive.org/web/20040803075026/www.htpshareware.com/todolist/index.htm>.
"Rainy's Rainlendar" [online], Aug. 12, 2004, http://web.archive.org/web/20040811043048/www.ipi.fi/~rainy/Rainlendard/Manual.html and http://web.archive.org/web/20040812092939/http://www.ipi.fi/~rainy/index.php?pn=probjects&project=rainlendar>.
Microsoft Windows XP Professional, Version 2002, Service pack 2, 3 pgs, screendumps.
Camarda, Using Microsoft Word 97, copyright 1997, QUE Corporation, pp. 412, 869.
Marshall School of Business, Workshop 1—Introduction to Outlook & E-mail, Apr. 6, 2000, pp. 1-11.
Jane Dorothy Calabria Burke, Ten Minute Guide to Lotus Notes 4.6, Publication date: Dec. 23, 1997, 2 pgs.
Bill Dyszel, Microsoft Outlook 2000 for Windows for Dummies, Copyright 1999, pp. 82-86, 102-103, 141,143.
Gina Danielle Venolia et al., Understanding Sequence and Reply Relationships within Email Conversations: A Mixed-Model Visualization, CHI 2003, Apr. 5-10, 2003, vol. No. 5, Issue No. 1, pp. 361-368.
Screen Dumps Microsoft Corporation, Microsoft Office Professional Edition 2003, 4 pp.
Screen Dumps Microsoft Corporation, Microsoft Office Professional Edition 2003, 5 pp.
Habraken, Microsoft Office XP 8 in 1, published Jun. 5, 2001, http://proquest.safaribooksonline.com/0789725096/, 12 pp.
Word 2002, Chapter 14; Paradigm Publishing Inc., copyright 2002; http://www.emcp.com/tech_tutorials/sig_irc/Signature_Word_Chapter_14.ppt, 21 pp.
Microsoft Office Word 2003, Part of Microsoft Office Professional Edition 2003, 1983-2003 Microsoft Corporation, 5 pp.
Microsoft Office 11 Beta Layperson's Specification, Copyright 2002, Microsoft Corporation, 28 pages.
FrontPage 11 Beta Layperson's Specification, Copyright 2002, Microsoft Corporation, 12 pages.
Office 11 Beta Letter, Copyright 2002, Microsoft Corporation, 6 pages.
Microsoft XDocs Beta Layperson Specification, Copyright 2002, Microsoft Corporation, 3 pages.
Microsoft Publisher 11 Beta Layperson's Specification, Copyright 2002, Microsoft Corporation, 13 pages.
Microsoft Office Word 2003, Part of Microsoft Office Professional Edition 2003, 1983-2003 Microsoft Corporation, screen shot 1, 1 pp.
Microsoft Office 2003, Microsoft Office Professional Edition 2003, Microsoft Corporation, 10 pages.
Screendumps—Microsoft Office, Microsoft Office Professional Edition 2003, Microsoft Corporation, 10 pages.
Screendumps—Microsoft Office Outlook, Microsoft Office Outlook Professional Edition 2003, Microsoft Corporation, 2 pages.
Nielsen, Jacob. "Tabs, Used Right," Alertbox, Sep. 17, 2007, http://www.useit.com/alertbox/tabs.html, 6 pages.
"Managing the Code Editor and View" Microsoft Corporation, http://msdn.microsoft.com/en-us/library/z01zks9a(VS.71).aspx, 2008.
Agarwal, Vikash K., "Creating a Visually Arresting User-Interface: A₃D Tab Control Example," Jan. 4, 2008, http://microsoft.apress.com/asptodayarchive/71723/creating-a-visually-arresting-user-interface-a-3d-tab-control-example, 12 pages.
"Omni Web Help," Omni Group, 2004, http://www.omnigroup.com/documentation/omniweb/browser/tabs.html, 2 pages.
Hepfner, Troy, "New SOCET CXP Interface Improves Usability," Sep. 2008, http://www.socetset.com/gxpmosaic/?p=95, 4 pages.
"Creating Charts: An Introduction," Excel for Chemists: . A Comprehensive Guide, E. Joseph Billo. http://www.ahut.edu.en/yxsz/ahk/Teaching/Excel%for%20Chemists/ChQ2.pdf.
Marsh, Bruce, Integrating Spreadsheet Templates and Data Analysis Into Fluid Power Instruction, Journal of Industrial Technology, vol. 16, No. 4, Aug. 2000-Oct. 2000. http://www.nait.org/jit/Articles/marsh071200.pdf.

(56) References Cited

OTHER PUBLICATIONS

"TeeChart for .NET Charting Control," Steema Software; accessed at: http://www.teechart.net/; accessed on Jan. 11, 2006.
Oracle Discoverer Desktop User's Guide; 10g (9.0.4) for Windows; Part No. B10272-01; published 2003; http://download-uk.oracle.com/docs/cd/B12166_01/bi/B10272_01/3graph.htm; pp. 1-18.
Lisa K. Averett; Joshua R. Knisley; Mark A. Marvin; Haiti: Projecting Tactical Network and Systems Management; 1995 IEEE pp. 906-910.
"Convert to Word 2007," http://www.regencytraining.com/word-2007-conversion.html, *Regency Training and Consulting*, 2 pages (Date Printed Apr. 21, 2008).
"Customer Story: SourceXtreme," SourceXtreme—Trolltech, http://trolltech.com/customers/casestories/stories/sourcextreme/?searchterm=sourcextreme, 2 pages (Date Printed Apr. 22, 2008).
"Inter-Widget Communication," http://web.mit.edu/6.115/www/miscfiles/amulet/amulet-help/IWC.htm, 6 pages (Feb. 13, 2007).
"The Technology in Document and Check Security," http://www.securedoc.in/thetechnology.htm, 7 pages (Date Printed Apr. 21, 2008).
Ando, R. et al., "Visualization-enabled multi-document summarization by Iterative Residual Rescaling," *Natural Language Engineering*, vol. 11, No. 1, pp. 67-86 (Mar. 2005) (2 page Abstract).
Bos, B, "Re: A proposal for addition to HTML 3.0: Frames," http://www.nyct.net/~aray/htmlwg/95q3/1141.html, 5 pages (Sep. 21, 1995).
de Candussio, N., "Common GUI Features Report," *Herschel CSDT Meeeting*, pp. 1-21 (Sep. 2007).
Krill, P., "Microsoft's Ribbon Interface Draws Frowns, Smiles," *InfoWorld*, http://www.infoworld.com/article/08/03/04/10NF-microsoft-fluentui_1.html, 3 pages (Mar. 4, 2008).
Rice, F, "Customizing the 2007 Office System Document Inspector," http://msdn2.microsoft.com/en-us/library/aa338203(d=printer).aspx, 10 pages (May 2006).
Boyce, "Microsoft Outlook Inside Out," 2001, pp. 133, 134, 721-728.
Halvorson et al., "Microsoft Office XP Inside Out," 2001, pp. 4, 5, 10, 11, 70-74, 281-288, 1010-1014.
Pogue, David. "Windows XP Home Edition: The Missing Manual," O'Reilly, 1st Edition, May 1, 2002, pp. 37, 38, 41.
Screendumps—Microsoft Office, Microsoft Corporation, Microsoft Office Professional Edition 2003, 13 pages.
Berliner E.M. et al., "Microsoft Office 2003", Feb. 24, 2004, p. 39-40, 120-124, 175-177, 233-234 [D1].
Berliner E.M. et al., "Microsoft Office 2003", Feb. 24, 2004, p. 173-178 [D2].
Perronne et al. "Building Java Enterprise Systems with J2EE", Publisher: Sams, Pub Date: Jun. 7, 2000 (pp. 1-8).
Padwick, Gordon "Using Microsoft Outlook 2000," 1999 Que Publishing, pp. 530-533.
Slovak, Ken. "Absolute Beginner's Guide to Microsoft Office Outlook 2003." 2003, Que Publishing, pp. 237-241.
Microsoft Press, Microsoft Computer Dictionary, Microsoft Press, Fifth Edition, 2002, pp. 374, 382.
Riggsby, McCoy, Haberman and Falciani, "Mastering Lotus Notes and Domino 6." 2003, pp. 18, 22, 33-35, 47, 122, 123, 215-241, 378.
"About Google Desktop Search", http://www.desktop.google.com/about.html, Oct. 15, 2004, 8 pages.
Find any file or email on your PC as fast as you can type!, http://www.x1.com, 2003, 1 page.
"Lookout", http://www.lookoutsoft.com, Apr. 22, 2005, 20 pages.
"Yahoo to test desktop search", http://news.com.com/yahoo+to+test+desktop+searcach/2100-1032_3-5486381.html, Dec. 9, 2004, 6 pages.
"Microsoft reinvents its own wheel", http://www.theinquirer.net/default.aspx?article=20214, Dec. 14, 2004, 5 pages.
"Microsoft Desktop Search (beta)", http://www.pcmag.com/article2/0.1895.1771841.00.asp, Mar. 2, 2005.
"Windows Desktop Search". Http://kunal.kundale.net/reviews/wds.html, Jul. 10, 2005, 7 pages.
"Microsoft Enters Desktop Search Fray", http://www.internetnews.com/ent-news/article.php/3447331, Dec. 13, 2004, 5 pages.
Screendumps—Microsoft Office (Microsoft Corporation, Microsoft Office Professional Edition 2003; 16 pages).
Clifton, The Application Automation layer—Using XML to Dynamically Generale GUI Elements—forms and controls, The Code Project, Jun. 2003, pp. 1-37.
ScreenShot of MS_Office_2003; (Microsoft Corporation, Microsoft Office Professional Edition 2003; 6 pages).
Halvorson et al., Microsoft Office Professional Official Manual, Aug. 20, 2002, 10 pgs.
Bellavista et al., "A Mobile Infrastructure for Terminal, User, and Resource Mobility", Network Operations and Management Symposium, NOMS 2000, pp. 877-890, IEEE/IFIP.
"Microsoft Office Professional Plus 2007", © 2006, Microsoft Corporation; 66 pgs.
Adler, "Emerging Standards for Component Software," Cybersquare, 1995 IEEE, 10 pgs.
Chamberland, et al., "IBM VisualAge for Java," vol. 37, No. 3, 1998, 26 pgs., http://researchweb.watson.ibm.com/journal/sj/373/chamberland.html [Accessed Feb. 6, 2007].
Zykov, "ConceptModeller: A Problem-Oriented Visual SDK for Globally Distributed Enterprise Systems." Proceedings of the 7th International Workshop on Computer Science and Information Technologies, CSIT 2005, 4 pgs.
"Create Office add-ins: ribbons, toolbars, taskpanes, menus etc.", http://www.add-in-xpress.com/creating-addins-blog/feed/, Jul. 4, 2007.
"RibbonX API: Extend the 2007 Office System with Your Own Ribbon Tabs and Controls", 2007, Microsoft Corporation, http://msdn.microsoft.com/msdnmag/issues/07/02RibbonX/de-fault.aspx.
"What's New in Excel 2007", Feb. 26, 2007.
Whitechapel et al., "Microsoft Visual Studio 2005 Tools for the 2007 Microsoft Office", Sep. 2006, http://72.14.235.104/search?q=cache:kXdutDB6o-wJ:download.microsoft.com/download/3/3/d/32db7049-bc04-4c79-a91b-7f62eaae754a/VSTO2005SE_Tutorial.doc+This+tutorial+focuses+on+the+new+features+introduced+in+VSTO+2005_SE&h1=en&ct=clnk&cd=3&gl=in.
"The New "Office 2007" User Interface", Microsoft Corporation © 2005, 32 pgs.
"The New Look in Office 12 / Office 2007", Office Watch, posted Sep. 20, 2005, 9 pgs.
Atwood, "Sometime a Word is Worth a Thousand Icons", Coding Horror, Feb. 22, 2006, 9 pgs.
Seo et al, "Hangul Office 2000 Tutoring Book", Sep. 15, 2000, 16 pgs.
Office 2007, Microsoft, Released on Nov. 6, 2006, 23 pgs.
Mock et al., "An Experimental Framework for Email Categorization and Management", Sep. 9-12, 2001, 3 pgs.
Yang, "Email Categorization Using Fast Machine Learning Algorithms", 2002, 8 pgs.
Islam et al., "Email Categorization Using Multi Stage Classification Technique", 2007, 3 pgs.
"Look and Layout", retrieved at <<http://liv.ac.uk/csd/email/outlook/layout.htm>>, University of Liverpool, 9 pgs.
"Preview Pane in Conversation: 4 pane view", 2005, Zinbra Inc., 3 pgs.
"Reading Pane in Conversation View", retrieved at <<http://www.zimbra.com/forums/users/5918-reading-pane-conversation-view.html>>, 5 pgs.
Ohmori, Yasuo et al., "Eigyo Mind—A Sales Support Tool," PFU Tech. Rev., vol. 10, No. 1, pp. 32-38, PFU Limited, May 1, 1999.
Danish Written Opinion Appl. No. SG 200504508-3 dated Sep. 18, 2006.
Danish Search Report Appl. No. SG 200504475-5 dated Sep. 19, 2006.
NZ Application No. 541301, Examination Report dated Jul. 25, 2005.
NZ Application No. 541300, Examination Report dated Jul. 25, 2005.
NZ Application No. 541299, Examination Report dated Jul. 25, 2005.

(56) References Cited

OTHER PUBLICATIONS

PCT Written Opinion and Search Report dated Jan. 9, 2007 cited in International Application No. PCT/US2006/033809.
PCT Search Report dated Feb. 6, 2007 cited in International Application No. PCT/US2006/035467.
PCT Search Report dated Feb. 26, 2007 cited in International Application No. PCT/US2006/034993.
European Communicated dated Oct. 20, 2005 cited in EP Application No. 04102463.0-2211 PCT/.
Australian Written Opinion/Search Report cited in Singapore Application No. 200505257-6 mailed Feb. 12, 2007.
International Search Report dated Oct. 17, 2007 cited in International Application No. PCT/US2006/012724.
International Search Report dated Nov. 27, 2007 in PCT/US2007/012573, 9 pages.
Chinese First Office Action dated Mar. 21, 2008 cited in Appln No. 200510092146.4.
Chinese First Office Action dated Mar. 21, 2008 cited in Appln No. 200510092139.4.
Chinese First Office Action dated Apr. 11, 2008 cited in Appln No. 200510092141.1.
Chinese First Office Action dated Apr. 18, 2008 cited in Appln No. 200510092142.6.
Philippines Examiner's Action dated Apr. 21, 2008 cited in Appln No. 1-2005-000405.
Philippines Examiner's Action dated Apr. 21, 2008 cited in Appln No. 1-2005-000406.
Chilean Office Action dated Mar. 28, 2008 cited in Appln No. 1770-05, no English Translation.
Chinese First Office Action dated May 23, 2008 cited in Appln No. 200510089514.X.
European Summons to Attend Oral Proceedings dated Jun. 23, 2008 cited in Appln No. 04102463.9.
Philippines Examiner's Action dated Jul. 31, 2008 cited in Appln No. 12005000495.
Philippines Examiner's Action dated Aug. 19, 2008 cited in Appln No. 12005000405.
Philippines Examiner's Action dated Sep. 12, 2008 cited in Appln No. 1200500406.
Chinese Second Office Action dated Oct. 10, 2008 cited in Appln No. 200510092141.1.
Chinese Second Office Action dated Oct. 17, 2008 cited in Appln No. 200510092139.4.
Chinese Second Office Action dated Nov. 21, 2008 cited in Appln No. 200510089514.X.
European Search Report dated Nov. 25, 2008 cited in Application EP 06 79 0087.
Chilean Office Action dated Nov. 27, 2008 cited in Appln No. 1768-2005.
Chilean Office Action dated Sep. 23, 2008 cited in Appln No. 1770-2005.
Chilean Office Action dated Nov. 27, 2008 cited in Appln No. 1769-2005.
Mexican Office Action dated Feb. 5, 2009 cited in Appln No. PA/a/2005/008349.
Mexican Office Action dated Mar. 3, 2009 cited in Appln No. PA/a/2005/008351 English language only.
Chilean Second Office Action dated Mar. 4, 2009 cited in Appln No. 2512-2005.
European Office Action mailed Mar. 9, 2009, cited in Appln No. 06790087.8.
Chinese Office Action dated Apr. 3, 2009 cited in Appln No. 200510089514.X.
Supplementary European Search Report dated Jun. 9, 2009 cited in EP Application No. 07795391.7-1225.
Mexican Office Action dated Jun. 19, 2009 cited in Appln. No. PA/a/2005/007073.
Chinese Third Office Action dated Jun. 19, 2009 cited in Appln No. 200510092139.4.
Russian Office Action dated Jun. 24, 2009 cited in Appln No. 2005120363/28(023023).
Chinese Office Action dated Jul. 3, 2009 cited in Appln. No. 200680018095.3.
Russian Office Action dated Jul. 21, 2009 cited in Appln No. 2005125837/09(029011).
Russian Office Action dated Jul. 30, 2009 cited in Appln No. 2005125831/09(029005).
Israeli Office Action dated Sep. 6, 2009 cited in Appln No. 169716.
Israeli Office Action dated Sep. 7, 2009 cited in Appln No. 169718.
European Search Report dated Sep. 7, 2009 cited in EP Application No. 09006972.5-2211.
Russian Office Action dated Sep. 10, 2009 cited in Appln No. 2005125836/09(029010).
Russian Office Action dated Sep. 10, 2009 cited in Appln No. 2005125839/09(029013).
European Communication dated Sep. 14, 2009 cited in Appln. No. 07795391.7-1225.
European Communication dated Sep. 28, 2009 cited in Appln No. 09006972.5-2211.
Israeli Office Action dated Oct. 12, 2009 cited in Appln No. 170668.
New Zealand Office Action dated Oct. 14, 2009 cited in NZ Application No. 566363.
Chinese Office Action dated Oct. 16, 2009 cited in Appln No. 200510092142.6.
Russian Office Action dated Oct. 26, 2009 cited in Appln No. 2005120363/09(023023).
Russian Office Action dated Oct. 30, 2009 cited in Appln No. 2005125837/09(029011).
Chilean Second Office Action dated Nov. 4, 2009 cited in Appln No. 1770-2005.
Chinese Office Action dated Nov. 27, 2009 cited in Appln No. 200680033212.3.
PCT Search Report and Written Opinion dated Nov. 30, 2009 cited in International Application No. PCT/US2009/046341.
Chilean Second Office Action dated Dec. 4, 2009 cited in Appln No. 1768-2005.
Russian Office Action dated Dec. 28, 2009 cited in Appln No. 2005125836/09(029010).
PCT Search Report and Written Opinion dated Dec. 29, 2009 cited in International Application No. PCT/US2009/046344.
Chinese Office Action dated Jan. 22, 2010 cited in Appln No. 200680032564.7.
Chilean Second Office Action dated Jan. 29, 2010 cited in Appln No. 1769-2005.
Chinese Third Office Action dated Feb. 12, 2010 cited in Appln No. 200510092142.6.
Philippines Examiner's Action dated Mar. 11, 2010 cited in Appln No. 1-2005-000405.
Chinese Office Action dated Mar. 11, 2010 cited in Appln No. 200780020312.7.
Australian Office Action dated Mar. 25, 2010 cited in Appln No. 2005203411.
Australian Office Action dated Mar. 25, 2010 cited in Appln No. 2005203412.
Australian Office Action dated Mar. 26, 2010 cited in Appln No. 2005203409.
Australian Office Action dated Apr. 8, 2010 cited in Appln No. 2005203410.
Mexican Office Action dated May 4, 2010 cited in Appln No. 2005/008354.
Australian Office Action dated May 28, 2010 cited in Appln No. 2005202717.
European Office Action dated Jun. 15, 2010 cited in EP Application No. 06814358.5.
Israeli Office Action dated Jul. 5, 2010 cited in Appln No. 169718.
Chinese Second Office Action dated Jul. 6, 2010 cited in Appln No. 200680033212.3.
Russian Office Action dated Jul. 26, 2010 cited in RU Application No. 2008109034, w/translation.
Mexican Office Action dated Aug. 12, 2010 cited in Appln No. 2005/008354.

(56) References Cited

OTHER PUBLICATIONS

PCT Written Opinion and Search Report dated Sep. 2, 2010 cited in International Application No. PCT/U52010/021888.
Malaysian Substantive Examination Adverse Report dated Sep. 30, 2010 cited in Appln No. PI 20052959.
Australian Office Action dated Oct. 21, 2010 cited in Appln No. 2006284908.
Israeli Office Action dated Oct. 28, 2010 cited in Appln No. 169716.
Chinese Second Office Action dated Oct. 29, 2010 cited in Appln No. 200680030421.2.
Chinese Office Action dated Nov. 11, 2010 cited in CN Application No. 200680032789.2, w/translation.
Russian Office Action dated Nov. 12, 2010 cited in Application No. 2008109034, w/translation.
PCT Written Opinion and Search Report dated Nov. 29, 2010 cited in International Application No. PCT/US2010/034277.
Mexican Office Action dated Jan. 6, 2011 cited in Appln No. PA/a/2005/008354.
Australian OA dated Jan. 17, 2011 cited in Application No. 2006287408.
Notice on Reexamination dated Jan. 21, 2011 cited in Appln No. 200510089514.X.
Chinese Third Office Action dated Feb. 10, 2011 cited in Appln No. 200680033212.3.
Egypt Official Decision dated Mar. 14, 2011 cited in Appln No. 2005080371.
Malaysian Substantive Examination Adverse Report dated Mar. 15, 2011 cited in Appln No. PI 20053260.
2nd Notice on Reexamination dated Mar. 25, 2011 cited in Appln No. 200510089514.X.
Mexican Office Action dated Mar. 31, 2011 cited in Appln No. PA/a/2005/008351.
Mexican Office Action dated Mar. 31, 2011 cited in Appin No. PA/a/2005/008349.
Mexican Office Action dated Mar. 31, 2011 cited in Appln No. PA/a/2005/008350.
Chinese Second Office Action dated Apr. 7, 2011 cited in Application No. 200680032789.2, w/translation.
Philippines Examiner's Action dated Apr. 12, 2011 cited in Appln No. 1-2005-00404.
Mexican Office Action dated May 26, 2011 cited in Appln. No. MX/a/2009/004151.
Chinese Second Office Action dated Jul. 14, 2011 cited in Appln No. 20680018095.3.
Chinese Decision on Rejection dated Jul. 21, 2011 cited in Appln No. 20068032789.2.
Korean Notice of Preliminary Rejection dated Jul. 22, 2011 cited in Appln No. 10-2005-0058160.
Japanese Notice of Rejection dated Aug. 12, 2011 cited in Appln. No. 2005-184990.
Korean Preliminary Rejection dated Aug. 23, 2011 cited in Appln. No. 10-2005-0067236.
Korean Preliminary Rejection dated Aug. 23, 2011 cited in Appln. No. 10-2005-0067411.
Korean Preliminary Rejection dated Aug. 29, 2011 cited in Appln. No. 10-2005-0066460.
Australian Office Action dated Aug. 31, 2011 cited in Appln. No. 2007255043.
3rd Official Notice, Mailing No. 134028, dated Sep. 16, 2011 cited in Appln. No. PH1707009.
4th Official Notice, Mailing No. 134052, dated Sep. 16, 2011 cited in Appln. No. PH1707009.
Mexican Office Action dated Oct. 3, 2011 cited in Appln. No. MX/a/2008/014849.
Korean Notice of Rejection dated Nov. 3, 2011 cited in Appln No. 10-2005-0067257.
Japanese Notice of Rejection dated Nov. 11, 2011 cited in Appln. No. 2008-530229.
Chinese Office Action dated Nov. 18, 2011 cited in Appln No. 200910148820.4.
U.S. Official Action dated Dec. 23, 2003 in U.S. Appl. No. 09/896,384.
U.S. Official Action dated Apr. 27, 2006 in U.S. Appl. No. 10/800,056.
U.S. Final Official Action dated Oct. 19, 2006 in U.S. Appl. No. 10/800,056.
U.S. Official Action dated Apr. 12, 2007 in U.S. Appl. No. 10/851,506.
U.S. Official Action dated Jun. 4, 2007 in U.S. Appl. No. 10/955,940.
U.S. Official Action dated Jul. 26, 2006 in U.S. Appl. No. 10/741,407.
U.S. Final Official Action dated Jan. 23, 2007 in U.S. Appl. No. 10/741,407.
U.S. Official Action dated Jan. 4, 2007 in U.S. Appl. No. 10/607,020.
U.S. Official Action dated Jun. 14, 2007 in U.S. Appl. No. 10/836,154.
U.S. Official Action dated Jun. 21, 2007 in U.S. Appl. No. 10/955,928.
U.S. Official Action dated Jul. 11, 2007 in U.S. Appl. No. 10/955,941.
U.S. Official Action dated Jul. 11, 2007 in U.S. Appl. No. 10/955,967.
U.S. Official Action dated Jul. 11, 2007 in U.S. Appl. No. 10/955,942.
U.S. Official Action dated Jul. 13, 2007 in U.S. Appl. No. 10/800,056.
U.S. Official Action dated Sep. 6, 2007 in U.S. Appl. No. 11/136,800.
U.S. Official Action dated Sep. 26, 2007 in U.S. Appl. No. 11/151,686.
U.S. Official Action dated Oct. 9, 2007 in U.S. Appl. No. 10/982,073.
U.S. Official Action dated Dec. 4, 2007 in U.S. Appl. No. 10/955,940.
U.S. Official Action dated Dec. 21, 2007 in U.S. Appl. No. 10/851,506.
U.S. Official Action dated Dec. 28, 2007 in U.S. Appl. No. 10/800,056.
U.S. Official Action dated Jan. 8, 2008 in U.S. Appl. No. 10/955,928.
U.S. Official Action dated Jan. 28, 2008 in U.S. Appl. No. 10/836,154.
U.S. Official Action dated Feb. 20, 2008 in U.S. Appl. No. 10/848,774.
U.S. Official Action dated Feb. 21, 2008 in U.S. Appl. No. 10/851,442.
U.S. Official Action dated Feb. 22, 2008 in U.S. Appl. No. 11/445,393.
U.S. Official Action dated Apr. 15, 2008 in U.S. Appl. No. 10/955,942.
U.S. Official Action dated Apr. 16, 2008 in U.S. Appl. No. 10/955,967.
U.S. Official Action dated Apr. 29, 2008 in U.S. Appl. No. 10/955,941.
U.S. Official Action dated May 28, 2008 in U.S. Appl. No. 10/982,073.
U.S. Official Action dated May 30, 2008 in U.S. Appl. No. 11/430,562.
U.S. Official Action dated Jun. 19, 2008 in U.S. Appl. No. 10/851,506.
U.S. Official Action dated Jun. 20, 2008 in U.S. Appl. No. 10/955,928.
U.S. Official Action dated Jul. 24, 2008 cited in U.S. Appl. No. 10/836,154.
U.S. Official Action dated Jun. 27, 2008 in U.S. Appl. No. 11/430,416.
U.S. Official Action dated Jul. 9, 2008 in U.S. Appl. No. 11/136,800.
U.S. Official Action dated Jul. 17, 2008 in U.S. Appl. No. 10/955,940.
U.S. Official Action dated Jul. 24, 2008 in U.S. Appl. No. 11/151,686.

(56) References Cited

OTHER PUBLICATIONS

U.S. Official Action dated Oct. 8, 2008 in U.S. Appl. No. 11/445,393.
U.S. Official Action dated Oct. 28, 2008 in U.S. Appl. No. 11/151,686.
U.S. Official Acton dated Nov. 13, 2008 in U.S. Appl. No. 11/430,562.
U.S. Official Action dated Nov. 25, 2008 in U.S. Appl. No. 11/154,278.
U.S. Official Action dated Dec. 11, 2008 in U.S. Appl. No. 10/982,073.
U.S. Official Action dated Dec. 23, 2008 in U.S. Appl. No. 10/955,942.
U.S. Official Action dated Dec. 24, 2008 in U.S. Appl. No. 10/955,967.
U.S. Official Action dated Jan. 6, 2009 in U.S. Appl. No. 10/955,941.
U.S. Official Action dated Jan. 9, 2009 in U.S. Appl. No. 11/430,561.
U.S. Official Action dated Mar. 18, 2009 in U.S. Appl. No. 11/401,470.
U.S. Official Action dated Apr. 7, 2009 in U.S. Appl. No. 10/955,940.
U.S. Official Action dated Apr. 28, 2009 in U.S. Appl. No. 12/028,797.
U.S. Official Action dated Jun. 1, 2009 in U.S. Appl. No. 11/445,393.
U.S. Official Action dated Jun. 8, 2009 in U.S. Appl. No. 10/982,073.
U.S. Official Action dated Jun. 10, 2009 in U.S. Appl. No. 11/154,278.
U.S. Official Action dated Jun. 11, 2009 in U.S. Appl. No. 11/151,686.
U.S. Official Acton dated Jun. 19, 2009 in U.S. Appl. No. 11/430,562.
U.S. Official Action dated Jun. 24, 2009 in U.S. Appl. No. 10/607,020.
U.S. Official Action dated Aug. 4, 2009 in U.S. Appl. No. 10/955,967.
U.S. Official Action dated Aug. 4, 2009 in U.S. Appl. No. 10/955,942.
U.S. Official Action dated Aug. 17, 2009 in U.S. Appl. No. 11/430,561.
U.S. Official Action dated Aug. 18, 2009 in U.S. Appl. No. 11/782,059.
U.S. Official Action dated Sep. 15, 2009 in U.S. Appl. No. 11/217,071.
U.S. Official Action dated Sep. 23, 2009 in U.S. Appl. No. 11/401,470.
U.S. Official Action dated Nov. 13, 2009 in U.S. Appl. No. 11/154,278.
U.S. Official Action dated Nov. 24, 2009 in U.S. Appl. No. 11/445,393.
U.S. Official Action dated Dec. 8, 2009 in U.S. Appl. No. 11/151,686.
U.S. Official Action dated Dec. 9, 2009 in U.S. Appl. No. 12/028,797.
U.S. Official Action dated Dec. 10, 2009 in U.S. Appl. No. 10/955,940.
U.S. Official Action dated Jan. 6, 2010 in U.S. Appl. No. 10/607,020.
U.S. Official Acton dated Jan. 7, 2010 in U.S. Appl. No. 11/430,562.
U.S. Official Action dated Jan. 20, 2010 in U.S. Appl. No. 10/955,967.
U.S. Official Action dated Jan. 25, 2010 in U.S. Appl. No. 10/982,073.
U.S. Official Action dated Feb. 18, 2010 in U.S. Appl. No. 11/782,059.
U.S. Official Action dated Feb. 19, 2010 in U.S. Appl. No. 10/955,942.
U.S. Official Action dated Feb. 22, 2010 in U.S. Appl. No. 11/401,470.
U.S. Official Action dated Mar. 30, 2010 in U.S. Appl. No. 11/217,071.
U.S. Official Action dated Apr. 15, 2010 in U.S. Appl. No. 11/823,999.
U.S. Official Action dated May 5, 2010 in U.S. Appl. No. 10/851,506.
U.S. Official Action dated May 25, 2010 in U.S. Appl. No. 10/607,020.
U.S. Official Action dated Jun. 3, 2010 in U.S. Appl. No. 12/028,797.
U.S. Official Acton dated Jun. 22, 2010 in U.S. Appl. No. 11/430,562.
U.S. Official Action dated Jun. 23, 2010 in U.S. Appl. No. 10/955,940.
U.S. Official Action dated Jul. 1, 2010 in U.S. Appl. No. 11/782,059.
U.S. Official Action dated Jul. 6, 2010 in U.S. Appl. No. 10/955,967.
U.S. Official Action dated Aug. 2, 2010 in U.S. Appl. No. 10/955,942.
U.S. Official Action dated Aug. 6, 2010 in U.S. Appl. No. 11/401,470.
U.S. Official Action dated Sep. 16, 2010 in U.S. Appl. No. 12/144,642.
U.S. Official Action dated Sep. 21, 2010 in U.S. Appl. No. 11/217,071.
U.S. Official Action dated Sep. 27, 2010 in U.S. Appl. No. 10/836,154.
U.S. Official Action dated Nov. 9, 2010 in U.S. Appl. No. 10/607,020.
U.S. Official Action dated Nov. 22, 2010 in U.S. Appl. No. 11/782,059.
U.S. Official Action dated Nov. 26, 2010 in U.S. Appl. No. 12/753,923.
U.S. Official Action dated Dec. 8, 2010 in U.S. Appl. No. 10/851,506.
U.S. Official Action dated Dec. 8, 2010 in U.S. Appl. No. 10/955,967.
U.S. Official Action dated Dec. 16, 2010 in U.S. Appl. No. 11/430,562.
U.S. Official Action dated Dec. 20, 2010 in U.S. Appl. No. 11/445,393.
U.S. Official Action dated Dec. 20, 2010 in U.S. Appl. No. 12/574,256.
U.S. Official Action dated Dec. 29, 2010 in U.S. Appl. No. 12/028,797.
U.S. Official Action dated Jan. 5, 2011 in U.S. Appl. No. 11/823,999.
U.S. Official Action dated Feb. 11, 2011 in U.S. Appl. No. 11/401,470.
U.S. Official Action dated Mar. 14, 2011 in U.S. Appl. No. 12/163,784.
U.S. Official Action dated Apr. 21, 2011 in U.S. Appl. No. 11/445,393.
U.S. Official Action dated Apr. 21, 2011 in U.S. Appl. No. 12/574,256.
U.S. Official Action dated May 5, 2011 in U.S. Appl. No. 10/836,154.
U.S. Official Action dated Aug. 3, 2011 in U.S. Appl. No. 12/142,927.
U.S. Official Action dated Sep. 13, 2011 in U.S. Appl. No. 12/372,386.
U.S. Official Action dated Sep. 14, 2011 in U.S. Appl. No. 12/163,758.
U.S. Official Action dated Oct. 25, 2011 in U.S. Appl. No. 12/144,642.
U.S. Official Action dated Nov. 2, 2011 cited in U.S. Appl. No. 10/836,154.
Israeli Office Action dated Jun. 3, 2012 cited in Appln No. 189293.
Korean Notice of Preliminary Rejection dated Nov. 12, 2012 cited in KR-10-2008-7005939.
Chilean Second Office Action dated Nov. 21, 2012 cited in Appln No. 1559-2010.

(56) References Cited

OTHER PUBLICATIONS

Canadian Office Action dated Nov. 23, 2012 cited in Appln No. 2,512,102.
Canadian Office Action dated Nov. 29, 2012 cited in Appln No. 2,512,047.
U.S. Official Action dated Oct. 24, 2012 in U.S. Appl. No. 13/102,633.
U.S. Official Action dated Nov. 23, 2012 in U.S. Appl. No. 11/782,059.
U.S. Official Action dated Dec. 5, 2012 in U.S. Appl. No. 12/777,287.
Miser, "Special Edition Using Mac OS X v10.2"; Pub. Date Jan. 3, 2003; QUE; Spe. Ed.; pp. 272-275.
Mori et al., "Design and Development of Multidevice User Interfaces through Multiple Logical Descriptions"; Aug. 2004; vol. 30; 14 pgs.
Canadian Office Action dated Nov. 29, 2012 cited in Appln No. 2,511,101 3 pgs.
Korean Notice of Rejection dated Feb. 22, 2013 in Appln No. 10-2008-7005078 13 pgs.
Korean Notice of Rejection dated Feb. 25, 2013 in Appln No. 10-2008-7005366, 5 pgs.
Japanese Notice of Preliminary Rejection dated Mar. 12, 2013 in Appln No. 2011-516371, 4 pgs.
Korean Notice of Preliminary Rejection dated Mar. 19, 2013 in Appln No. 10-2008-7005659, 4 pgs.
Japanese Notice of Preliminary Rejection dated Mar. 19, 2013 in Appln No. 2011-514652, 6 pgs.
Chinese Fourth Office Action dated Apr. 23, 2013 cited in Appln No. 200980124944.7, 7 pgs.
EP Search Report dated Apr. 18, 2013 in Appln No. PCT/US2006/012724, 12 pgs.
U.S. Official Action dated Mar. 14, 2013 in U.S. Appl. No. 12/574,256, 73 pgs.
U.S. Official Action dated Apr. 1, 2013 in U.S. Appl. No. 12/163,784, 39 pgs.
U.S. Official Action dated Apr. 4, 2013 in U.S. Appl. No. 11/782,059, 39 pgs.
U.S. Official Action dated Apr. 18, 2013 in U.S. Appl. No. 10/851,506, 34 pgs.
U.S. Official Action dated Apr. 29, 2013 in U.S. Appl. No. 12/954,952, 18 pgs.
Philippines Substantive Examination Report dated Apr. 25, 2013 cited in Appln No. 1-2005-000495.
EP Search Report dated May 10, 2013 cited in Appln No. PCT/US2009/044292.
Mexican Office Action dated May 23, 2013 in Appln No. MX/a/2008/003342.
U.S. Official Action dated May 21, 2013 in U.S. Appl. No. 13/437,031, 13 pgs.
U.S. Official Action dated May 23, 2013 in U.S. Appl. No. 11/401,470, 101 pgs.
U.S. Appl. No. 13/464,572, filed May 4, 2012 entitled "Accessing an Out-Space User Interface for a Document Editor Program".
Changing a Graph Type: Ultimate Illustration of Excel 2002 for Windows XP, General Book, X-media Corp., Aug. 31, 2002, p. 224.
Mexican Office Action dated Feb. 3, 2012 cited in Appln No. MX/A/2008/002889 with summary.
Taiwan Office Action dated Feb. 8, 2012 cited in Appln No. 94123640, with Eng Lang Summary.
Israeli Office Action dated Feb. 23, 2012 cited in Appln No. 170668.
Taiwan Search Report dated Mar. 14, 2012 cited in Appln No. 094123420.
Chinese Fourth Office Action dated Apr. 27, 2012 cited in Appln No. 200680018095.3.
Japanese Notice of Rejection dated May 11, 2012 cited in Appln No. 2009-513223.
U.S. Official Action dated Apr. 26, 2012 in U.S. Appl. No. 11/782,059.
U.S. Official Action dated May 8, 2012 in U.S. Appl. No. 12/144,642.
Russel et al., (hereinafter "Russel"); "Special Edition Using Microsoft® Office Outlook® 2003"; Que publishing on Sep. 25, 2003, 71 pgs.
Israeli Office Action dated May 3, 2012 cited in Appln No. 169718.
Taiwan Office Action dated May 14, 2012 cited in Appln No. 94122180, with Eng Lang Summary.
Mexican Office Action dated Jun. 6, 2012 cited in Appln No. MX/a/2008/014849.
Chinese Second Office Action dated Jun. 18, 2012 in Appln No. 200910148820.4.
Chinese Office Action dated Jul. 2, 2012 in Appln No. 200980124944.7.
U.S. Official Action dated Jun. 6, 2012 in U.S. Appl. No. 12/777,287.
U.S. Official Action dated Jun. 19, 2012 in U.S. Appl. No. 12/769,787.
Malaysian Substantive Examination Adverse Report dated Jan. 31, 2012 cited in Appln No. PI 20053258.
Malaysian Substantive Examination Adverse Report dated Jan. 31, 2012 cited in Appln No. PI 20053259.
European Search Report dated Feb. 10, 2012 cited in Appln No. 05107153.8.
European Search Report dated Feb. 15, 2012 cited in Appln No. 05107157.9.
European Search Report dated Feb. 28, 2012 cited in Appln No. 05107184.3.
Chinese Office Action dated Feb. 29, 2012 cited in Appln No. 200980124664.9.
Chinese Decision on Rejection dated Mar. 7, 2012 cited in Appln No. 200780020312.7.
Chinese Second Office Action dated Mar. 9, 2012 cited in Appln No. 200980124383.0.
Japanese Notice of Final Rejection dated Mar. 9, 2012 cited in Appln No. 2008-513476.
European Search Report dated Mar. 16, 2012 cited in Appln No. 05107186.6.
Taiwan Notice of Allowance dated Mar. 29, 2012 cited in Appln No. 10120306600.
Douglas et al., "Dynamic Popup Menu Titles"; IP.Com Journal, IP.COM Inc., West Henrietta, NY, Aug. 1, 1992, 2 pgs.
Haden et al.; "Scrollable Popup Menu with Selection Tracking Display of Graphical Objects", IP.Com Journal, IP.COM Inc., West Henrietta, NY, Aug. 1, 1994, 6 pgs.
"Index Card Metaphor for Multiple Property Sheets Associated with a Given Object"; IBM Technical Disclosure Bulletin, International Business Machines Corp., vol. 33, No. 3A, Aug. 1, 1990, 2 pgs.
"Menu Selection Method for Related Attributes"; IBM Technical Disclosure Bulletin, International Business Machines Corp., vol. 33, No. 6B, Nov. 1990, 3 pgs.
U.S. Official Action dated Feb. 27, 2012 in U.S. Appl. No. 12/372,386.
U.S. Official Action dated Mar. 14, 2012 in U.S. Appl. No. 12/142,927.
U.S. Appl. No. 13/437,031, filed Apr. 2, 2012 entitled "Automatic Grouping of Electronic Mail".
U.S. Appl. No. 13/427,939, filed Mar. 23, 2012 entitled "An Improved User Interface for Displaying a Gallery of Formatting Options Applicable to a Selected Object".
Chinese Office Action dated Nov. 29, 2011 cited in Appln. No. 200980124383.0.
Ribbons; Microsoft; © 2012 Microsoft; http://msdn.microsoft.com/en-us/library/windows/desktop/cc872782.aspx; 45 pgs.
AutoCAD 2011—Customization Guide; Feb. 2010; Autodesk, Inc.; http://images.autodesk.com/adsk/files/acad_acg.pdf; 554 pgs.
Chinese Decision on Reexamination dated Feb. 1, 2012 cited in Appln No. 200510089514.X.
Chilean Office Action dated Mar. 29, 2012 cited in Appln No. 1560-2010, w/English Language Summary.
Chilean Office Action dated Mar. 29, 2012 cited in Appln No. 1559-2010, w/English Language Summary.

(56) References Cited

OTHER PUBLICATIONS

India First Examination Report dated Mar. 30, 2012 cited in Appln No. 1817/DEL/2005.
Japanese Notice of Allowance dated Apr. 11, 2012 cited in Appln No. 2008-530229.
U.S. Official Action dated Apr. 5, 2012 in U.S. Appl. No. 12/163,758.
U.S. Official Action dated Apr. 19, 2012 in U.S. Appl. No. 13/102,633.
Israeli Office Action dated Jun. 18, 2013 cited in Appln No. 170668.
EP Communication dated Jul. 17, 2013 in Appln No. EP 07 795 391.7.
Chinese Second Office Action dated Aug. 5, 2013 in Appln No. 201080021957.4.
Russian Decision on Grant dated Aug. 12, 2013 in Appln No. 2010151922/08.
U.S. Official Action dated Aug. 2, 2013 in U.S. Appl. No. 12/777,287, 47 pgs.
U.S. Official Action dated Aug. 19, 2013 in U.S. Appl. No. 10/851,506, 24 pgs.
U.S. Official Action dated Aug. 30, 2013 in U.S. Appl. No. 12/574,256, 31 pgs.
U.S. Official Action dated Sep. 6, 2013 in U.S. Appl. No. 12/028,797, 113 pgs.
U.S. Appl. No. 14/032,094, filed Sep. 19, 2013 entitled "User Interface for Displaying Selectable Software Functionality Controls that are Relevant to a Selected Object", Satterfield et al.
Canadian Office Action dated Sep. 18, 2013 in Appln No. 2,512,036.
Japanese Notice of Rejection dated Sep. 19, 2013 in Appln No. 2012-153634.
Mexican Office Action dated Sep. 27, 2013 in Appln No. MX/a/2008/014849.
EP Communications to Attend Oral Proceedings dated Oct. 4, 2013 in Appln No. 09 006 972.5.
Canadian OA dated Oct. 7, 2013 in Appln No. 2,650,016.
Chilean Third Office Action dated Oct. 9, 2013 in Appln No. 2512-2005.
Mexican Office Action dated Oct. 28, 2013 cited in Appln. No. MX/a/2010/013566.
U.S. Appl. No. 14/142,132, filed Dec. 27, 2013 entitled "Expanded Search and Find User Interface".
Chinese Third Office Action dated Dec. 4, 2013 in Appln No. 200680032789.2.
Canadian Office Action dated Dec. 5, 2013 in Appln No. 2,618,169.
Chinese Decision on Rejection dated Jan. 13, 2014 in Appln No. 200980124644.9.
U.S. Official Action dated Dec. 6, 2013 in U.S. Appl. No. 10/851,506, 25 pgs.
Israeli Office Action dated Oct. 17, 2013 cited in Appln No. 1611334.
India First Examination Report dated Oct. 21, 2013 cited in Appln No. 1017/DEL/2004.
Canadian Office Action dated Oct. 30, 2013 in Appln No. 2,512,047.
Korean Notice of Preliminary Rejection dated Nov. 7, 2013 cited in KR-10-2008-7029272.
Canadian Office Action dated Nov. 15, 2013 in Appln No. 2,512,102.
U.S. Official Action dated Nov. 8, 2013 in U.S. Appl. No. 13/615,668, 114 pgs.
U.S. Official Action dated Nov. 15, 2013 in U.S. Appl. No. 11/782,059, 33 pgs.
U.S. Official Action dated Nov. 29, 2013 in U.S. Appl. No. 13/769,598, 73 pgs.
Ringel et al., "Automated Message Prioritization: Making Voicemail Retrieval More Efficient"; In CHI'02 Extended Abstracts on Human Factors in Computing Systems; Apr. 20, 2002; pp. 592-593.
Kumar et al., "A personal agent application for the semantic web"; In AAAI Fall Symposium on Personalized Agents; 2002; pp. 1-8.
Gorniak, Peter; "Sorting email messages by topic", 1998; 1 pg.

Maes et al., "Learning Interface Agents"; In AAAI (vol. 93); 1993; pp. 459-465.
Malaysian Notice of Allowance Received in Patent Application No. PI 20080400, Mailed Date: Sep. 13, 2013, Filed Date: Aug. 29, 2006, 2 Pages.
Notice of Allowance Received for Korea Republic of (KR) Patent Application No. 10-2008-7005939, Mailed Date: Nov. 20, 2013, Filed Date: Sep. 12, 2006, 2 Pages. (w/o English Translation).
Russian Notice of Allowance Issued in Patent Application No. 2010152843, Mailed Date: Feb. 20, 2014, 16 Pages.
Israeli Office Action dated Feb. 28, 2014 in Appln No. 209012, 6 pgs.
Mexican Office Action Received for Mexican Patent Application No. PA/a/2005/008349, Mailed Date: Mar. 14, 2014, Filed Date: Aug. 5, 2005, 12 Pages. (w/o English Translation).
Canadian Office Action dated Jul. 30, 2014 cited in Appln No. 2,512,155, 8 pgs.
Canadian Office Action dated Jul. 30, 2014 cited in Appln No. 2,512,102, 7 pgs.
Chinese Third Office Action dated Aug. 12, 2014 cited in Appln No. 200780020312.7, 13 pgs.
Mexican Office Action dated Aug. 14, 2014 cited in Appln No. PA/a/2005/008349, 18 pgs.
U.S. Official Action dated Aug. 25, 2014 in U.S. Appl. No. 13/102,633, 117 pgs.
Japanese Office Action Issued in Patent Application No. 2011-550149, Mailed Date: Jan. 20, 2014, Filed Date: Jan. 22, 2010, 5 Pages.
Australian Office Action Issued in Patent Application No. 2010216342, Mailed Date: Mar. 14, 2014, Filed Date: Jan. 22, 2010, 3 Pages.
Mexican Notice of Allowance Received in Patent Application No. MX/a/2008/002889, Mailed Date: Apr. 1, 2014, Filed Date: Aug. 29, 2006, 1 Page. (w/o English Translation).
Russian Notice of Allowance Issued in Patent Application No. 2011134380, Mailed Date: Apr. 5, 2014, Filed Date: Jan. 22, 2010, 22 Pages.
Australian Notice of Allowance Received for Australia Patent Application No. 2009262833, Mailed Date: Apr. 16, 2014, Filed Date: Jun. 5, 2009, 2 Pages.
Taiwan Search Report dated May 7, 2014 cited in Appln No. 098117357, 13 pgs.
Japanese Notice of Allowance Issued in Patent Application No. 2011-550149, Mailed Date: May 8, 2014, Filed Date: Jan. 22, 2010, 4 Pages.
Australian Second Office Action Issued in Patent Application No. 2010216342, Mailed Date: May 12, 2014, Filed Date: Jan. 22, 2010, 3 Pages.
Taiwan Search Report dated May 12, 2014 cited in Appln No. 098119245, 11 pgs.
Notice of Allowance Issued in Chinese Patent Application No. 200680032789.2, Mailed Date: May 15, 2014, Filed Date: Sep. 8, 2006, 4 pages.
Russian Decision on Grant dated May 20, 2014 in Appln No. 2011145984/08, 24 pgs.
Japanese Final Decision of Rejection dated May 27, 2014 in Appln No. 2012-110939, 4 pgs.
EP Communication dated Jun. 2, 2014 in Appln No. 07 795 391.7, 9 pgs.
Chilean Second Office Action dated Jun. 6, 2014 in Appln No. 1987-2011, 12 pgs.
Russian Decision on Grant dated Jul. 20, 2014 in Appln No. 2010138162, 14 pgs.—No English Language Translation.
U.S. Official Action dated Jul. 1, 2014 in U.S. Appl. No. 12/372,386, 93 pgs.
U.S. Official Action dated Jul. 30, 2014 in U.S. Appl. No. 13/102,633, 36 pgs.
U.S. Appl. No. 13/925,523, filed Jun. 24, 2013 entitled "Communication Between a Document Editor-in-Space User Interface and a Document Editor Out-Space User Interface", Dukhon et al.
U.S. Appl. No. 14/150,531, filed Jan. 8, 2014 entitled "Modifying and Formatting a Chart Using Pictorially Provided Chart Elements".

(56) References Cited

OTHER PUBLICATIONS

U.S. Appl. No. 14/226,421, filed Mar. 24, 2014 entitled "Exposing Non-Authoring Features Through Document Status Information in an Out-Space User Interface".
Inoue; "Let's Learn PowerPoint Using Actual Samples"; Nikkei PC21, Japan, Nikkei Business Publications, Inc., Apr. 1, 2008, vol. 13, No. 7, 5 pgs.—No English Translation.
Ramamritham et al., Scheduling Algorithms and Operating Systems Support for Real-Time Systems; © 1994; IEEE; 13 pages.
Zweben et al., Scheduling and Rescheduling with Iterative Repair, © 1993; IEEE; 9 pages.
Mexican Office Action dated Jun. 11, 2013 cited in Appln. No. MX/a/2008/003342.
Mexican Office Action dated Jul. 9, 2013 in Appln No. MX/a/2008/002889, 13 pgs.
Mexican Office Action dated Aug. 20, 2013 in Appln No. MX/a/2011/011749, 10 pgs.
Japanese Office Action dated Jan. 9, 2014 cited in JP Application No. 2012-510906 w/translation, 4 pgs.
Malaysian Substantive Examination Report dated Jan. 15, 2014 in Appln No. PI 20080508, 3 pgs.
EP Communication dated Jan. 27, 2014 in Appln No. 09 767 2208, 7 pgs.
Canadian Office Action dated Jan. 28, 2014 in Appln No. 2,511,101, 4 pgs.
Norway Office Action dated Feb. 10, 2014 in Appln No. 20053655, 4 pgs.
Norway Office Action dated Feb. 10, 2014 in Appln No. 20053658, 4 pgs.
EP Communication dated Feb. 11, 2014 cited in Appln No. 09 798 374.6, 6 pgs.
Mexican Office Action dated Feb. 11, 2014 cited in Appln No. MX/a/2008/003342, 8 pgs.
EP Communication on Decision to Refuse dated Feb. 20, 2014 cited in Appln No. 09 006 972.5, 15 pgs.
Australian Office Action dated Feb. 28, 2014 in Appln No. 2009262834, 3 pgs.
Australian Office Action dated Feb. 28, 2014 in Appln No. 2009262833, 3 pgs.
Australian Office Action dated Mar. 4, 2014 in Appln No. 2009260596, 4 pgs.
Australian Office Action dated Mar. 4, 2014 in Appln No. 2009271517, 3 pgs.
Taiwan Office Action dated Mar. 17, 2014 in Appln. No. 98118252, 10 pgs.
India First Examination Report dated Mar. 19, 2014 in Appln No. 1818/DEL/2005, 1 pg.
Chilean Office Action dated Mar. 30, 2014 in Appln No. 2804-2011, 7 pgs.
Chinese Third Office Action dated Apr. 3, 2014 in Appln No. 201080021957.4, 6 pgs.
Canadian Office Action dated Apr. 25, 2014 in Appln No. 2,512,155, 9 pgs.
Australian Second Office Action dated Apr. 29, 2014 in Appln No. 2009271517, 3 pgs.
Philippines Substantive Examination Report dated Apr. 30, 2014 cited in Appln No. 1-2008-500356, 1 pg.
Australian Office Action dated Apr. 30, 2014 in Appln No. 2010247882, 3 pgs.
EP Search Report dated Jun. 2, 2014 in Appln No. PCT/US2010/034277, 6 pgs.
U.S. Official Action dated Jan. 16, 2014 in U.S. Appl. No. 13/102,633, 45 pgs.
U.S. Official Action dated Jan. 29, 2014 in U.S. Appl. No. 12/777,287, 44 pgs.
U.S. Official Action dated Feb. 4, 2014 in U.S. Appl. No. 10/607,020, 149 pgs.
U.S. Official Action dated Feb. 26, 2014 in U.S. Appl. No. 12/954,952, 38 pgs.
U.S. Official Action dated Mar. 4, 2014 in U.S. Appl. No. 12/142,927, 45 pgs.
U.S. Official Action dated Apr. 18, 2014 in U.S. Appl. No. 11/782,059, 42 pgs.
U.S. Official Action dated Apr. 25, 2014 in U.S. Appl. No. 12/028,797, 42 pgs.
U.S. Official Action dated May 14, 2014 in U.S. Appl. No. 13/615,668, 34 pgs.
U.S. Official Action dated May 30 2014 in U.S. Appl. No. 13/027,289, 188 pgs.
U.S. Official Action dated Jun. 2, 2014 in U.S. Appl. No. 13/769,598, 32 pgs.
Embedding and Linking Excel Worksheets into Word; 2001, The McGraw-Hill Companies, Inc, 6 pgs.
India First Examination Report Issued in Patent Application No. 1820/DEL/2005, Mailed Date: Mar. 20, 2014, 1 Page.
Israeli Office Action dated May 15, 2014 in Appln No. 209047, 6 pgs.
Israeli Office Action dated May 15, 2014 in Appln No. 209048, 15 pgs.
Canadian Office Action Issued for Patent Application No. 2618169, Mailed Date: Sep. 9, 2014, 4 pgs.
Taiwan Office Action and Search Report Issued in Patent Application No. 98145363, Mailed Date: Oct. 2, 2014, 25 Pages.
Chilean Office Action dated Oct. 24, 2014 in Appln No. 2804-2011, 5 pgs. (w/o English Translation).
Israel Office Action Issued in Patent Application No. 169717, Mailed Date: Oct. 29, 2014, 1 Page; (w/o English Translation).
Malaysian Substantive Examination Report dated Nov. 14, 2014 in Appln No. PI 2010005637, 3 pgs.
India First Examination Report dated Dec. 23, 2014 in Appln No. 1819/del/2005, 2 pgs.
Norwegian Office Action dated Nov. 29, 2014 in Appln No. 20053658 4 pgs.
Norwegian Office Action dated Nov. 29, 2014 in Appln No. 20053655, 3 pgs.
U.S. Official Action dated Dec. 24, 2014 in U.S. Appl. No. 13/102,633, 42 pgs.
U.S. Official Action dated Jan. 15, 2015 in U.S. Appl. No. 12/028,797, 47 pgs.
Microsoft Office XP/2002, Wikipedia, http://en.wikipedia.org/wiki/Microsoft_Office_XP, May 31, 2001; 3 pgs.
Akamatsu, "Touch with a Mouse, A Mouse Type Interface Device with Tactile and Force Display"; © IEEE; 1995; 5 pgs.
Israeli Office Action dated Mar. 6, 2014 in Appln No. 194785, 5 pgs.
Canadian Office Action dated Sep. 4, 2014 in Appln No. 2,512,036, 3 pgs.
Chinese Office Action dated Sep. 15, 2014 in Appln No. 201210079579.6, 11 pgs.
Canadian Office Action dated Sep. 30, 2014 in Appln No. 2,617,182, 3 pgs.
Chinese Decision on Reexamination dated Nov. 18, 2014 in Appln. No. 200910148820.4, 15 pgs.
U.S. Official Action dated Sep. 11, 2014 in U.S. Appl. No. 13/427,939, 133 pgs.
U.S. Official Action dated Oct. 24, 2014 in U.S. Appl. No. 13/615,668, 35 pgs.
U.S. Official Action dated Nov. 28, 2014 in U.S. Appl. No. 13/437,031, 100 pgs.
Mexican Office Action Received in Patent Application No. MX/a/2010/013566, Mailed Dated: Jun. 12, 2013, 3 Pages.
Israeli Office Action Received in Patent Application No. 209011, Mailed Dated: Sep. 10, 2013, 5 Pages.
Chilean Office Action Received in Patent Application No. 2804-2011, Mailed Date: Apr. 4, 2014, 7 Pages. (w/o English Translation).
U.S. Official Action dated Sep. 10, 2014 in U.S. Appl. No. 12/954,952, 52 pgs.
U.S. Official Action dated Sep. 18, 2014 in U.S. Appl. No. 11/782,059, 41 pgs.
U.S. Official Action dated Sep. 30, 2014 in U.S. Appl. No. 13/595,084, 185 pgs.
"Microsoft Office 2003 Editions Product Guide", Published on: Sep. 2003, Available at: tp://www.google.ca/url?sa=t&rct=j&q=&esrc=s

(56) References Cited

OTHER PUBLICATIONS

&frm=1&source=web&cd=3&ved=0CCoQFjAC
&url=http%3A%2F%2Fdownload.microsoft.
com%2Fdownload%2F0%2Ff%2F1%2F0f1d5b1f-53bc-47c3-bf6f-
ac6d67cf9766%2FOffice2003Guide.doc&ei=CKTkVPBCgb-
xBL6qgvAH&usg=AFQjCNEpNk4IFH6m27BXr481Kv1kRXo_
xA, 167 pgs.
Murray; First Look 2007 Microsoft Office System; Jun. 21, 2006; Microsoft Press; 16 pgs.
Schwartz, Microsoft Office 2007 for Windows: Visual QuickStart Guide, 11 pgs.
Lyons et al., The Oval Menu-Evolution and Evaluation of a Wedget, © 1996; IEEE; 8 pgs.
Yaser, "Microsoft Office Word 2003", Retrieved from: <<http://www.just.edu.jo/~yaser/courses/cs98/slides/Microsoft%20Office%20Word%202003.ppt>>, 2003, 49 Pages.
Word 2003 Introduction, Retrieved from: <<http://www.photoshoplondon.com/www/training-manuals/Word2003Intro.pdf>>, The Mouse Training Company, Sep. 9, 1999, 166 Pages.
Canadian Notice of Allowance dated Jun. 2, 2015 in Appln No. 2,512,036, 1 pg.
Canadian Office Action dated Aug. 3, 2015 in Appln No, 2,724,201, 5 pgs.
Canadian Office Action dated Feb. 19, 2015 in Appln No. 2,848,667, 5 pgs.
Canadian Office Action dated Feb. 19, 2015 in Appln No. 2,848,700, 4 pgs.
Canadian Office Action dated Jul. 14, 2015 in Appln No, 2,725,046, 5 pgs.
Canadian Office Action dated May 26, 2015 cited in Appln No. 2,618,169, 4 pgs.
Canadian Office Action dated Oct. 16, 2015 in Appln No. 2,724,681, 7 pgs.
Canadian Office Action Issued in Application No. 2,848,700, Mailed Date: Oct. 15, 2015, 4 Pages.
Canadian Office Action Issued in Patent Application No. 2,512,155, Mailed Date: Nov. 30, 2015, 7 Pages.
Chinese Fifth Office Action dated Dec. 16, 2015 in Appln No. 200910148820.4, 6 pgs.
Chinese Fourth Office Action dated Aug. 3, 2015 in Appln No. 200910148820.4, 6 pgs.
Chinese Fourth Office Action dated Feb. 15, 2015 in Appln No. 200780020312.7, 9 pgs.
Chinese Notice on Reexamination dated Jul. 8, 2015 cited in Appln No. 200980124644.9, 8 pgs.
Chinese Third Office Action dated Feb. 2, 2015 in Appln No. 200910148820.4, 12 pgs.
EP Communication dated Mar. 23, 2016 in Appln No. 06 790 087.8, 6 pgs.
EP Communication dated May 18, 2015 cited in 10 775 348.5, 7 pgs.
European Extended Search Report in Application No. 10775348.5, mailed Jun. 2, 2014, 6 Pages.
India Examination Report dated Feb. 17, 2015 in Appln No. 1568/DEL/2005, 3 pgs.
India First Examination Report dated May 6, 2015 cited in Appln No. 1979/DELNP/2008, 2 pgs.
Indonesian Office Action Issued in Patent Application No. P00200500444, Mailed Date: Jan. 16, 2015, 3 Pages. (w/o English Translation).
Israeli Office Action dated Mar. 2, 2015 in Appln No. 213908, 5 pgs.
Israeli Office Action Issued in Patent Application No. 215418, Mailed Date: Apr. 28, 2015, 3 Pages.
Israeli Office Action Issued in Patent Application No. 213908, Mailed Date: Feb. 3, 2015, 3 pages. (w/o English Translation).
Israeli Office Action Issued in Patent Application No. 221792, Mailed Date: Feb. 16, 2016, 4 pgs.
Japanese Notice of Allowance Issued in Patent Application No. 2012-510906, Mailed Date: Jul. 10, 2014, 3 Pages. (w/o English Translation).
Japanese Office Action Issued in Japan Patent Application No. 2012-510906, Mailed Date: Jan. 16, 2014, 4 Pages.
Japanese Office Action Issued in Patent Application No. 2014-163396, Mailed Date: Oct. 21, 2015, 5 Pages.
Korean Notice of Allowance Issued in Patent Application No. 10-2010-7029199, Mailed Date: Apr. 24, 2015, 2 Pages. (w/o English Translation).
Korean Notice of Final Rejection in Application 10-2010-7028097, mailed Apr. 28, 2016, 4 pgs. (No English translation).
Korean Notice of Final Rejection in Application 10-2010-7028989, mailed Apr. 28, 2016, 4 pgs. (No English translation).
Korean Notice of Preliminary Rejection dated Oct. 19, 2015 in Appln No. 10-2010-7028989, 7 pgs. (No English Language Translation).
Korean Notice of Preliminary Rejection dated Sep. 30, 2015 in Appln No. 10-2010-7028097, 7 pgs. (No english translation).
Korean Notice of Preliminary Rejection Issued in Patent Application No. 10-2011-7018813, Mailed Date: Jan. 8, 2016, 4 Pages.
Korean Office Action in Application 10-2011-7026740, mailed Mar. 11, 2016, 4 Pages.
Malaysia Substantive Examination Report dated Jun. 30, 2015 in Appln No. PI 2010005439, 2 pgs.
Malaysian Adverse Report in Application PI 2011003348, mailed Mar. 15, 2016, 3 pgs.
Malaysian Modified Substantive Examination Report dated Jan. 30, 2015 in Appln No. PI 2010005558, 3 pgs.
Malaysian Substantive Examination Report dated Jan. 30, 2015 in Appln No. PI 2010005439, 3 pgs.
Mexican Office Action Issued in Mexico Patent Application No. MX/a/2011/011749, Mailed Date: Aug. 2, 2013, 6 Pages. (w/o English Translation).
Norway Office Action dated in Appln No. 20053655, mailed Mar. 2, 2016, 3 pgs.
Norway Office Action dated Jan. 22, 2016 in Appln No, 20054097, 1 pg. (No english translation).
Norwegian Office Action dated Jul. 27, 2015 in Appln No. 20053655, 3 pgs.
Norwegian Office Action Received for Patent Application No. 20053656, Mailed Date: Nov. 19, 2014, 2 pgs.
Taiwan Office Action dated May 22, 2015 cited in Appln No. 101133155 with Eng Lang Summary, 4 pgs.
Taiwan Office Action dated May 25, 2015 cited in Appln No. 102112935 with Eng Lang Summary, 4 pgs.
Canadian Office Action Issued in Patent Application No. 2848700, Mailed Date: May 2, 2016, 04 Pages.
Canadian Office Action Issued in Patent Application No. 2724681, Mailed Date: Apr. 15, 2016, 5 Pages.
U.S. Official Action dated Feb. 24, 2015 in U.S. Appl. No. 13/769,598, 33 pgs.
U.S. Official Action dated Feb. 24, 2015 in U.S. Appl. No. 11/782,059, 37 pgs.
Notice of Allowance dated Mar. 19, 2015 in U.S. Appl. No. 13/464,572, 40 pgs.
U.S. Official Action dated Mar. 27, 2015 in U.S. Appl. No. 12/142,927, 68 pgs.
Notice of Allowance dated Apr. 16, 2015 in U.S. Appl. No. 13/595,084, 19 pgs.
U.S. Official Action dated Apr. 29, 2015 in U.S. Appl. No. 13/427,939, 43 pgs.
U.S. Official Action dated Jun. 12, 2015 in U.S. Appl. No. 13/615,668, 26 pgs.
U.S. Official Action dated Jun. 17, 2015 in U.S. Appl. No. 13/437,031, 12 pgs.
U.S. Official Action dated Jun. 19, 2015 in U.S. Appl. No. 14/150,531, 135 pgs.
U.S. Official Action dated Jun. 24, 2015 in U.S. Appl. No. 13/769,598, 20 pgs.
U.S. Official Action dated Jun. 30, 2015 in U.S. Appl. No. 11/782,059, 30 pgs.
Notice of Allowance dated Jul. 28, 2015 in U.S. Appl. No. 13/595,084, 15 pgs.
U.S. Official Action dated Sep. 14, 2015 in U.S. Appl. No. 12/142,927, 31 pgs.

(56) References Cited

OTHER PUBLICATIONS

U.S. Official Action dated Oct. 1, 2015 in U.S. Appl. No. 13/427,939, 25 pgs.
U.S. Official Action dated Nov. 10, 2015 in U.S. Appl. No. 14/150,531, 31 pgs.
Notice of Allowance dated Nov. 20, 2015 in U.S. Appl. No. 13/769,598, 15 pgs.
U.S. Official Action dated Jan. 4, 2016 in U.S. Appl. No. 13/615,668, 28 pgs.
U.S. Official Action dated Jan. 29, 2016 in U.S. Appl. No. 14/142,132, 149 pgs.
Notice of Allowance dated Mar. 15, 2016 in U.S. Appl. No. 14/032,094, 30 pgs.
U.S. Official Action dated Mar. 21, 2016 in U.S. Appl. No. 13/437,031, 41 pgs.
U.S. Appl. No. 12/142,927, Office Action mailed Apr. 7, 2016, 21 pgs.
U.S. Appl. No. 14/032,094, Notice of Allowance mailed Apr. 18, 2016, 2 pgs.
U.S. Appl. No. 13/769,598, Notice of Allowance mailed Apr. 7, 2016, 4 pgs.
U.S. Appl. No. 14/226,421, Office Action mailed May 6, 2016, 18 pgs.
U.S. Appl. No. 14/150,531, Office Action mailed May 20, 2016, 22 pgs.
U.S. Appl. No. 13/427,939, Office Action mailed May 25, 2016, 18 pgs.
U.S. Appl. No. 14/032,094, Notice of Allowance mailed Jun. 24, 2016, 8 pgs.
Malaysian Substantive Examination Adverse Report in Application PI 2011004990, mailed Mar. 15, 2016, 3 pgs.
European Office Action in Application 05107186.8, mailed Jul. 27, 2016, 6 pgs.
European Office Action in Application 05107153.8, mailed Jul. 22, 2016, 6 pgs.
Canadian Notice of Allowance in Application 2750422, mailed Mar. 10, 2016, 1 page.
Chilean Notice of Allowance in Application 201101987, mailed Mar. 30, 2016, 2 pgs; (w/o English translation).
Korean Office Action in Patent Application No. 10-2011-7018813, mailed Jul. 29, 2016, 3 pgs; w/o English translation).
U.S. Appl. No. 14/142,132, Notice of Allowance mailed Aug. 3, 2016, 17 pgs.
U.S. Appl. No. 14/226,421, Amendment and Response filed Aug. 5, 2016, 8 pgs.
U.S. Appl. No. 13/925,523, Office Action mailed Aug. 2, 2016, 7 pgs.
U.S. Appl. No. 13/615,668, Amendment and Response filed Jun. 2, 2016, 12 pgs.
U.S. Appl. No. 14/032,094, Notice of Allowance mailed Aug. 9, 2016, 24 pgs.
U.S. Appl. No. 13/427,939, Amendment and Response filed Aug. 3, 2016, 14 pgs.
U.S. Appl. No. 12/028,797, Notice of Allowance mailed Feb. 27, 2015, 14 pgs.
U.S. Appl. No. 14/226,421, Notice of Allowance mailed Aug. 31, 2016, 7 pgs.
U.S. Appl. No. 13/615,668, Office Action mailed Sep. 1, 2016, 18 pgs.
Canadian Office Action in Application 2512155, mailed Aug. 26, 2016, 4 pgs.
Chilean Office Action in Application 200501770, mailed Sep. 2, 2016, 2 pgs. (no English translation).
Chilean Office Action in Application 200501769, mailed Sep. 2, 2016, 2 pgs. (no English translation).
Barr, Jim, "Gmail Tips—The Complete Collection", Retrieved Date: Dec. 15, 2004, https://web.archive.org/web/20041215091758/http://g04.com/misc/GmailTipsComplete.html,18 pgs.
Shinder, Deb, "Locate and organize e-mail messages with Outlook 2003 search folders", retrieved at: http://www.techrepublic.com/article/locate-and-organize-e-mail-messages-with-outlook-2003-search-folders/, Aug. 5, 2004, obtained Sep. 28, 2016, 12 pgs.
U.S. Appl. No. 13/427,939, Office Action mailed Sep. 13, 2016, 13 pgs.
U.S. Appl. No. 14/032,094, Notice of Allowance mailed Sep. 30, 2016, 9 pgs.
Walther, Henrik, "Using Search Folders in Outlook 2003", retrieved at: http://www.outlookexchange.com/articles/henrikwalther/using_search_folders_in_outlook_2003.asp, published Jan. 2004, obtained Sep. 28, 2016, 5 pgs.

\* cited by examiner

*500*

510
Original order

From: Madeleine Kelly  *550*
Sent: Monday, November 15, 2004 11:13 PM
To: Marketing Team
Subject: FW: NYT: Microsoft's Spelling Lessons Check it out.

---

— *540*
From: Kevin Kennedy
Sent: Monday, November 15, 2004 9:59 PM
To: Dictionary Central
Subject: FW: NYT: Microsoft's Spelling Lessons Interesting article

---

— *530*
From: David Alexander
Sent: Sunday, November 14, 2004 9:10 PM
To: Peter Bankov; Jason Carlson; Jose De Oliveira; Stefan Delmarco; Mark Lee; Ana Lidman; Patricia San Juan; Naoki Sato
Subject: NYT: Microsoft's Spelling Lessons This is really interesting. It is definitely worth a read. The article deals with how the spelling...

520
Reversed Thread

*530*
From: David Alexander
Sent: Sunday, November 14, 2004 9:10 PM
To: Peter Bankov; Jason Carlson; Jose De Oliveira; Stefan Delmarco; Mark Lee; Ana Lidman; Patricia San Juan; Naoki Sato
Subject: NYT: Microsoft's Spelling Lessons This is really interesting. It is definitely worth a read. The article deals with how the spelling...

---

— *540*
From: Kevin Kennedy
Sent: Monday, November 15, 2004 9:59 PM
To: Dictionary Central
Subject: FW: NYT: Microsoft's Spelling Lessons Interesting article

---

— *550*
From: Madeleine Kelly
Sent: Monday, November 15, 2004 11:13 PM
To: Marketing Team
Subject: FW: NYT: Microsoft's Spelling Lessons Check it out.

Sample Email I have no idea. You pick!
Deb.

---

From: Roberto Taboada
Sent: Friday, October 22, 2004 2:01 PM
To: Deborah Harris
Subject: Dinner Where do you want to go for dinner?
Roberto

600

620

XML Markup`<html`
`xmlns:e="urn:schemas-microsoft-`
`com:office:mailheader">`
`<e:m>`I have no idea. You pick!
Deb.`</e:m>`
`<e:m>`_____

---

`<e:f>`From: `<e:v>`Roberto Taboada`</e:v></e:f>`
`<e:s>`Sent: `<e:v>`Friday, October 22,
2004 2:01 PM`</e:v></e:s>`
`<e:t>`To: `<e:v>`Deborah Harris`<e:v></e:t>`
`<e:a>`Subject: `<e:v>`Dinner`</e:v></e:a>`

Where do you want to go for dinner?
Roberto`</e:m>`

Sample EmailHere it is

---

From: Madeleine Kelly
Sent: Monday, November 15, 2004 11:13 PM
To: Marketing Team
Subject: FW: NYT: Microsoft's Spelling Lessons Check it out.

---

From: Kevin Kennedy
Sent: Monday, November 15, 2004 9:59 PM
To: Dictionary Central
Subject: FW: NYT: Microsoft's Spelling Lessons Interesting article

---

From: David Alexander
Sent: Sunday, November 14, 2004 9:10 PM
To: Peter Bankov; Jason Carlson; Jose De Oliveira; Stefan Delmarco; Mark Lee; Ana Lidman; Patricia San Juan; Naoki Sato
Subject: NYT: Microsoft's Spelling Lessons This is really interesting. It is definitely worth a read. The article deals with how the spelling...

*720*  ⌐700

XML Markup`<html xmlns:e="urn:schemas-microsoft-com:office:mailheader">`
`<e:m>`Here it is`</e:m>`
`</e:m>`
`<e:m>`_____
`<e:f>`From: `<e:v>` Madeleine Kelly `</e:v></e:f>`
`<e:s>`Sent: `<e:v>`Monday, November 15, 2004 11:13 PM`</e:v></e:s>`
`<e:t>`To: `<e:v>` Marketing Team`</e:v></e:t>`
`<e:a>`Subject: `<e:v>`FW: NYT: Microsoft's Spelling Lessons`</e:v></e:a>`

Check it out.
`</e:m>`
`<e:m>`_____
`<e:f>`From: `<e:v>`Kevin Kennedy`</e:v></e:f>`
`<e:s>`Sent: `<e:v>`Monday, November 15, 2004 9:59 PM`</e:v></e:s>`
`<e:t>`To: `<e:v>`Dictionary Central`</e:v></e:t>`
`<e:a>`Subject: `<e:v>`FW: NYT: Microsoft's Spelling Lessons`</e:v></e:a>`

Interesting article
`</e:m>`
`<e:m>`_____
`<e:f>`From: `<e:v>` David Alexander `</e:v></e:f>`
`<e:s>`Sent: `<e:v>`Sunday, November 14, 2004 9:10 PM`</e:v></e:s>`
`<e:t>`To: `<e:v>` Peter Bankov; Jason Carlson; Jose De Oliveira; Stefan Delmarco; Mark Lee; Ana Lidman; Patricia San Juan; Naoki Sato `</e:v></e:t>`
`<e:a>`Subject: `<e:v>`NYT: Microsoft's Spelling Lessons`</e:v></e:a>`

This is really interesting. It is definitely worth a read. The article deals with how the spelling...`</e:m>`

*Fig. 7*

NAVIGATING MESSAGES WITHIN A THREAD

RELATED APPLICATIONS

This utility patent application claims the benefit under 35 United States Code §119(e) of U.S. Provisional Patent No. 60/715,725 filed on Sep. 9, 2005, which is hereby incorporated by reference in its entirety.

BACKGROUND

Electronic communication has become an integral part of an individual's life both at business and at home. Through the use of electronic communications, such as email, Instant Messaging, SMS, and the like, individuals are able to keep in touch, transact business and set up meetings. For example, some personal information manager (PIM) programs allow a user to manage and organize e-mail messages, schedules, tasks, notes, contacts, and other information.

In order to help a user navigate their e-mail messages more easily they may group messages by attributes such as: date, size, conversation, subject, importance, and the like. Many users read their email messages online. It is often hard, however, to read a long email conversation given the length of the contents and the numerous replies aggregated into a single thread.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A user may easily read, browse, and jump through the messages contained within a thread. User interface elements make it easier for a user to identify the messages that are contained within the thread. Different portions of the message may be highlighted such that they are easily identifiable. The user may easily navigate through the thread by selecting a user interface element, such as an arrow button, to move to the next or previous message within the thread. The order of the thread may also be reversed such that the user may view the thread from the first message to the last message, or view the thread from the last message to the first message. The messages within the thread may be marked, such as by using XML tags, in order to facilitate the identification of the sections of the messages within the thread.

BRIEF DESCRIPTION OF THE DRAWINGS

FIG. 5 shows reversing the order or the messages within a thread;

FIG. 6 illustrates tagging threads;

FIG. 7 shows a complex thread; and

DETAILED DESCRIPTION

Figure 1:
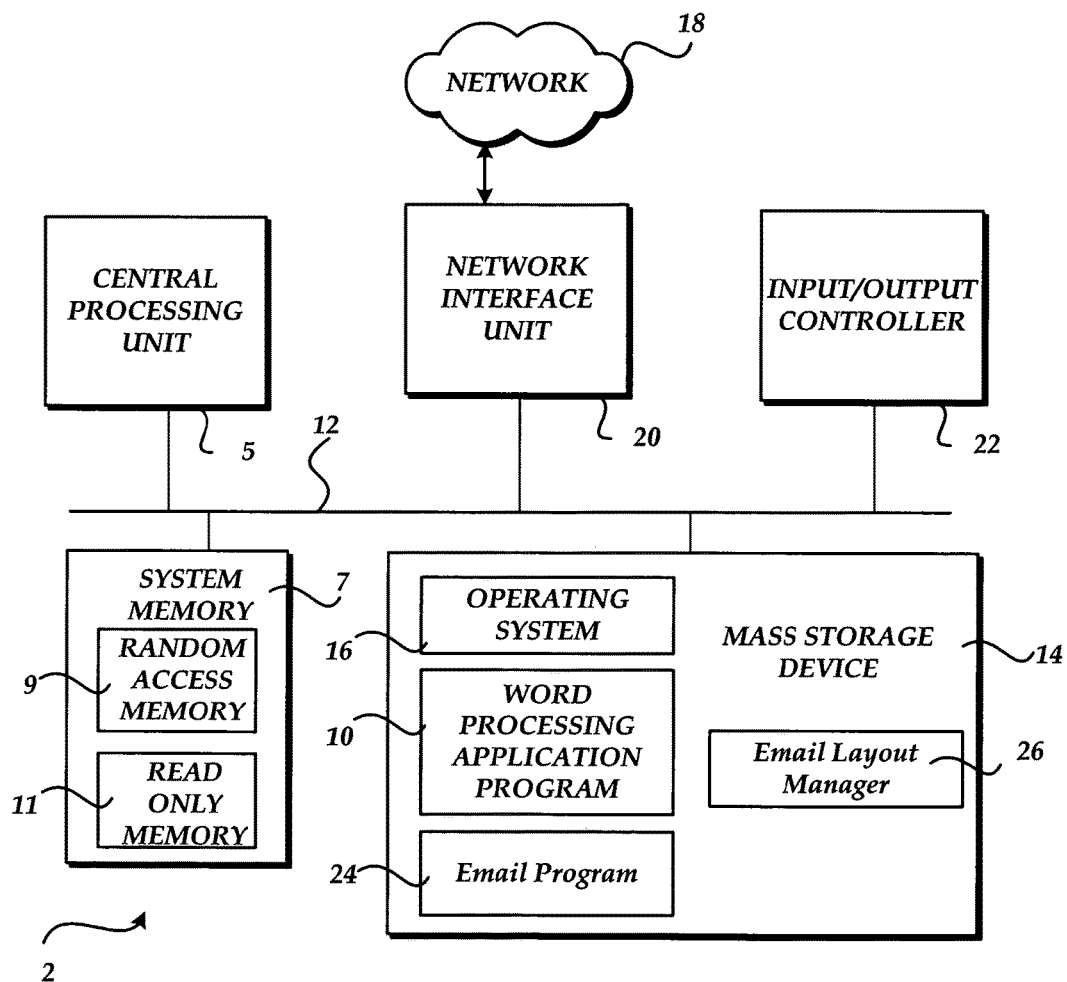
FIG. 1 illustrates an exemplary computing device.

Referring now to the drawings, in which like numerals represent like elements, various aspects of the present invention will be described. In particular, FIG. 1 and the corresponding discussion are intended to provide a brief, general description of a suitable computing environment in which embodiments of the invention may be implemented.

Generally, program modules include routines, programs, components, data structures, and other types of structures that perform particular tasks or implement particular abstract data types. Other computer system configurations may also be used, including hand-held devices, multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments of the described herein are referred to variously as operations, structural devices, acts or modules. These operations, structural devices, acts and modules may be implemented in software, in firmware, in special purpose digital logic, and any combination thereof.

As used herein, the term "message" refers to the region of a thread that is from the beginning of one message header within the thread to the beginning of the next message header that is within the thread.

Referring now to FIG. 1, an illustrative computer architecture for a computer 2 utilized in the various embodiments will be described. The computer architecture shown in FIG. 1 illustrates a conventional desktop or laptop computer, including a central processing unit 5 ("CPU"), a system memory 7, including a random access memory 9 ("RAM") and a read-only memory ("ROM") 11, and a system bus 12 that couples the memory to the CPU 5. A basic input/output system containing the basic routines that help to transfer information between elements within the computer, such as during startup, is stored in the ROM 11. The computer 2 further includes a mass storage device 14 for storing an operating system 16, application programs, and other program modules, which will be described in greater detail below.

The mass storage device 14 is connected to the CPU 5 through a mass storage controller (not shown) connected to the bus 12. The mass storage device 14 and its associated computer-readable media provide non-volatile storage for the computer 2. Although the description of computer-readable media contained herein refers to a mass storage device, such as a hard disk or CD-ROM drive, the computer-readable media can be any available media that can be accessed by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers through a network 18, such as the Internet. The computer 2 may connect to the network 18 through a network interface unit 20 connected to the bus 12. The network interface unit 20 may also be utilized to connect to other types of networks and remote computer systems. The computer 2 may also include an input/output controller 22 for receiving and processing input from a number of other devices, including a keyboard, mouse, or electronic stylus (not shown in FIG. 1). Similarly, an input/output controller 22 may provide output to a display screen, a printer, or other type of output device.

As mentioned briefly above, a number of program modules and data files may be stored in the mass storage device 14 and RAM 9 of the computer 2, including an operating system 16 suitable for controlling the operation of a networked personal computer, such as the WINDOWS XP operating system from MICROSOFT CORPORATION of Redmond, Wash. The mass storage device 14 and RAM 9 may also store one or more program modules. In particular, the mass storage device 14 and the RAM 9 may store an email program 24 and a word processing application program 10. The word processing application program 10 is operative to provide functionality for creating and editing electronic documents, such as an email for email program 24. According to one embodiment of the invention, the word processing application program 10 comprises the MICROSOFT WORD word processing application program from MICROSOFT CORPORATION. Other word processing applications may also be utilized.

The email application program 24 is operative to provide functionality relating to emails. For example, email program 24 may be used for creating, displaying, sending and receiving emails. According to one embodiment of the invention, the email application program 24 comprises the MICROSOFT OUTLOOK email application program from MICROSOFT CORPORATION. Other email and/or messaging applications may also be utilized.

In conjunction with the displaying of an email, an email layout manager 26 may be utilized to format the email for easier navigation. Although email layout manager 26 is shown separately from email program 24, this functionality may reside in many places. For instance, it may be included in the email program or at some other location. Generally, email layout manager 26 configures a thread such that it may be easily navigated.

Figure 2:
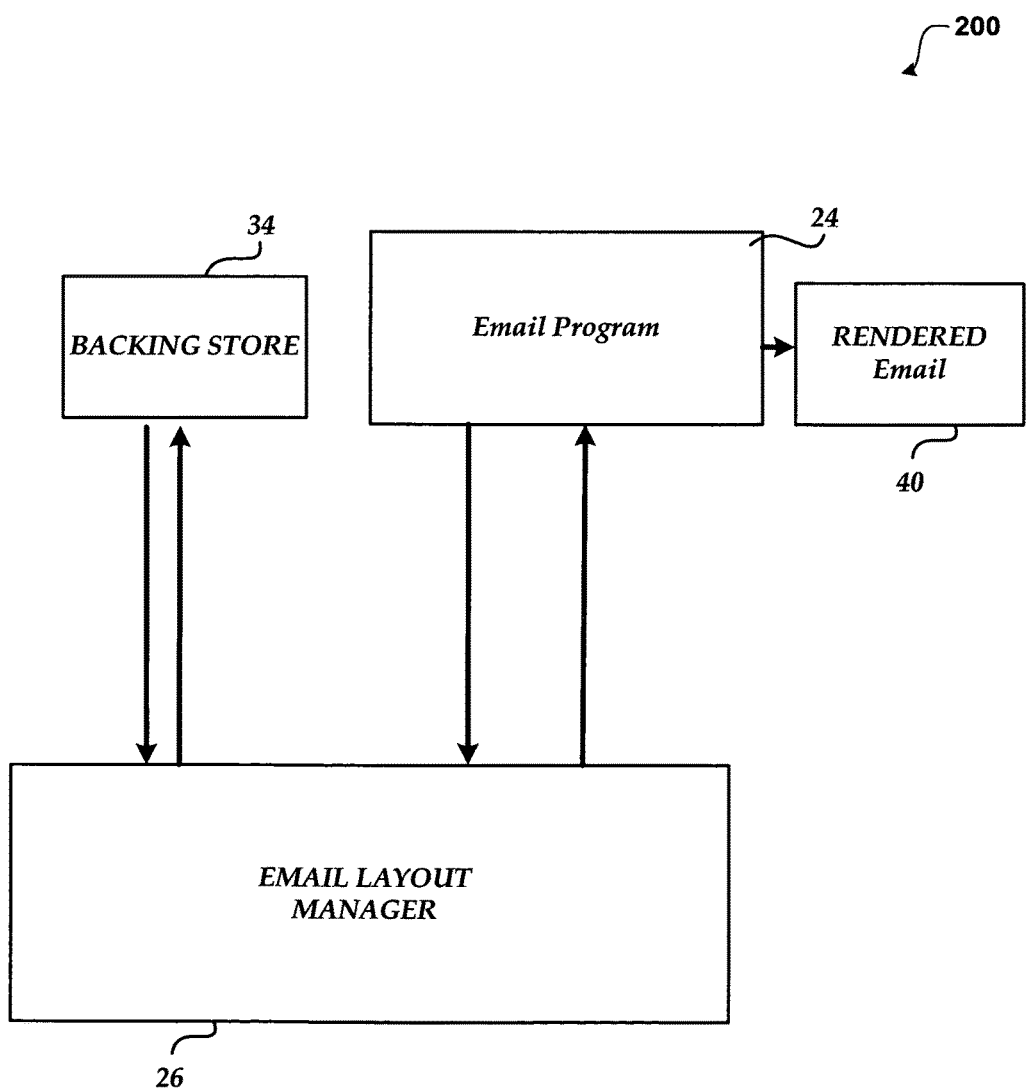
FIG. 2 is a functional block diagram generally illustrating a thread navigation system.

FIG. 2 illustrates a thread navigation system 200, in accordance with aspects of the invention.

Generally, thread navigation system 200 helps a user to read, browse, and jump through the messages that are contained within a thread. The layout manager 26 provides services for email application 24. According to one embodiment, email documents and corresponding threads may be stored in a backing store 34. In order to facilitate communication with the layout manager 26, one or more callback routines, may be implemented. Through the use of the callback code, the layout manager 26 may query for additional information necessary to configure various portions of threads.

The layout manager 26 provides facilities for formatting an email and navigating through a thread. The layout manager 26 provides these facilities in response to a request from the email application program 24. Email program 24 and layout manager 26 includes navigation tools to make it easier to read, browse, and jump through relevant portions of an email thread. Layout manager 26 may include user interface elements within an email to make it easier for a user to identify and navigate the messages that are contained within the thread. Layout manager 26 may also highlight different portions of the message such that they are more easily identifiable. When a user interface element is contained within the thread, a user may easily navigate through the thread by selecting a user interface element, such as an arrow button, to move to the next or previous message within the thread. Layout manager 26 may also change the order of the messages within the thread before it is rendered. For example, the order of the thread may be reversed such that the user may view the thread from the first message that was sent in the thread to the last message (most current message), or view the thread from the last message to the first message. Layout manager 26 may also mark the thread, such as by using XML tags, in order to facilitate the identification of the sections of the messages within the thread.

The email program 24 may communicate with the layout manager 26 to request that at least a portion of the thread be formatted. The email program 24 may also provide to the layout manager 26 the text and other content from the email that should be formatted. Tagging portions of an email thread allows email program to more easily identify sections within the thread. For example, XML markup may be used to tag the header portion of an email such that it may easily be identified. Email program 24 is also configured to render an email document 40.

Figure 3:
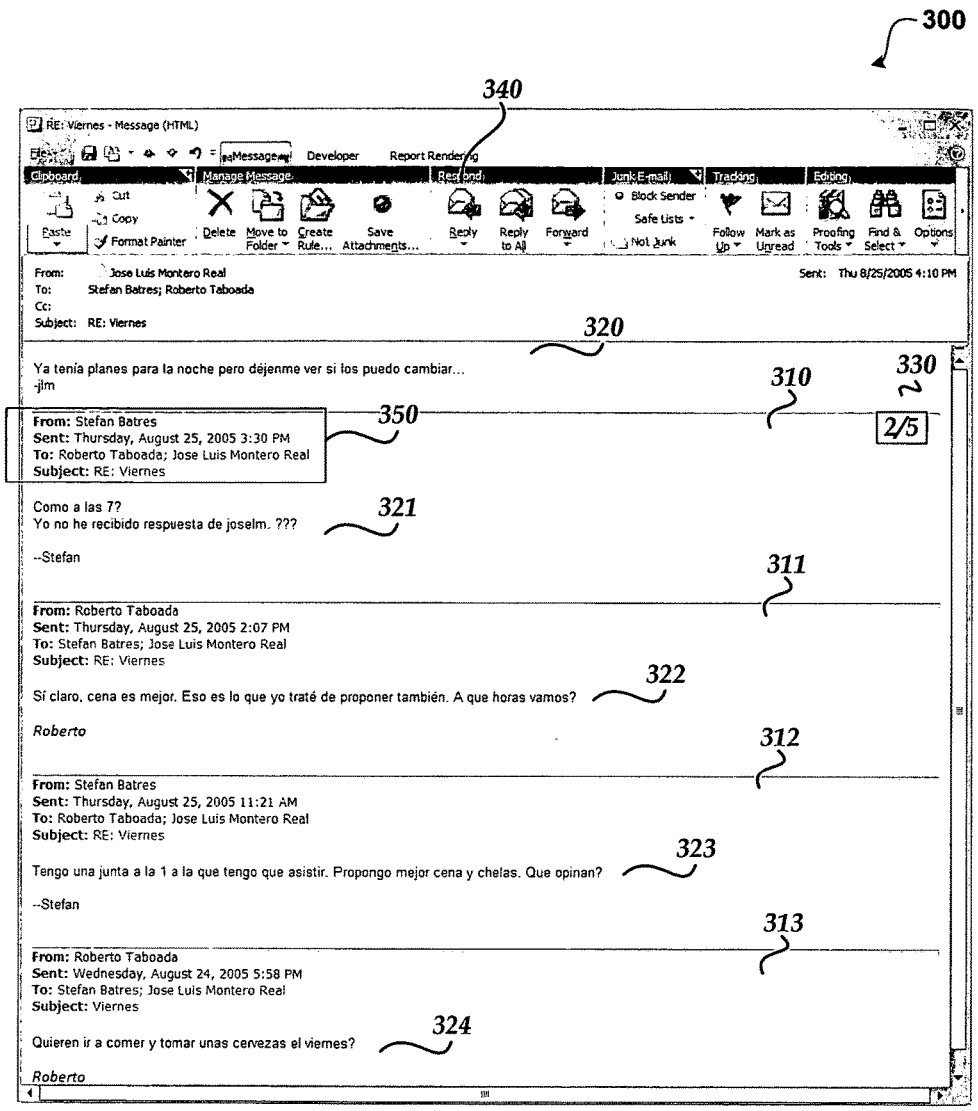
FIG. 3 shows an exemplary thread.

FIG. 3 shows an exemplary thread. As illustrated, email thread 300 shows five different messages (320, 321, 322, 323 and 324) within the email thread 300. According to one embodiment, the header and/or beginning of each message is shaded (See 310, 311, 312 and 313) so that the user can easily identify where the different messages begin and end. Any way of highlighting the individual messages within the thread may be used. For example, the messages could be shown in one color and the header information could be shown in a different color. According to other embodiments, the headers may be displayed in many different manners. For example, they could be shown collapsed, semi-collapsed or fully expanded. Other information may also be stored in the header. For instance, the header could include a number (330) indicating the number of the current message within thread. In the present example, the second header 310 indicates that it is the second of five total messages (330).

According to one embodiment, when a user hits reply 340, the header information gets tagged and is included in the reply. One method to identify headers is to use heuristics to determine where that header is, by looking for fields within the thread, such as: "from" "to"; "subject", etc. (See box 350). Another alternative to locating the headers is to tag the headers. For instance, XML markup may be used to indicate where the header is (See Figures and related discussion below). Heuristics can reasonably determine where a header may begin and end, but using XML markup a program may be certain as to who the sender was and who the recipients were and what the subject is and what the date is. According to one embodiment, the headers are gradient shaded (310-313) so the header stands out. This shading helps the user visually parse the thread. A user can quickly scroll down through the email thread and know that when the shading begins the next message within the thread begins.

The header may also be distinguishable based on characteristics such as who sent the email, the dates, or other information. For example, the headers associated with one user may be colored red (not shown) whereas the headers associated with another user may be colored green.

Figure 4:
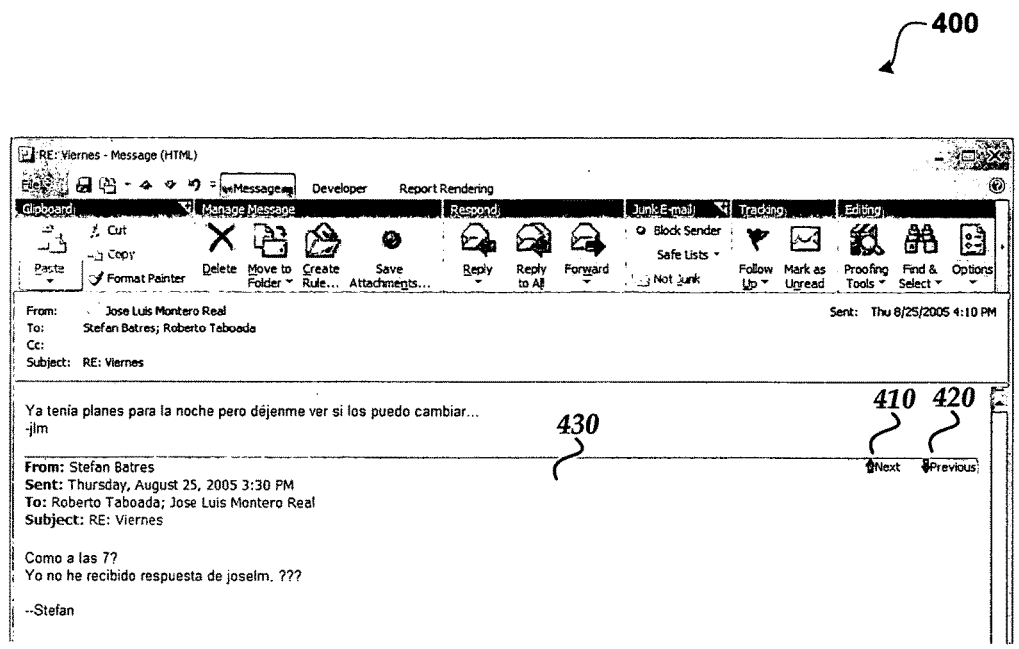
FIG. 4 illustrates a user interface element for navigating messages within a thread.

FIG. 4 illustrates a user interface element 400 for navigating messages within a thread. A user interface element may provide the user with a way to navigate from one message to the next within the thread without having to scroll through the thread. According to one embodiment, a next arrow 410 and a previous arrow 420 allow a user to navigate to the next message or previous message within the thread.

According to one embodiment, when the user hovers over a shaded area of the header 430, the two navigational arrows (410 and 420) appear and when selected the displayed portion of the thread quickly jumps to the next header or to the previous one within the thread. In this way, the user can place their cursor over an arrow and keep clicking to move through the thread without having to move their mouse to select another message. This allows a user to easily navigate the messages within the email thread by going to each message within the thread very quickly. For example, if a user is looking for somebody's specific reply, the user could keep clicking one of the navigational arrows to navigate the e-mail thread until that reply is located.

The use of the navigational arrows is an alternative to scrolling through the email thread to search for something. The user can visually look at one portion of the screen and keep clicking one of the navigational arrows and eventually click to bring the message to the portion of the screen the user is looking. According to one embodiment of the invention, the user may select a user interface element to move to the start or end of the email thread. Going to the bottom of the email allows the user to chronologically read the email. A user can read what the first person said and then either click the up arrow or scroll to go to the next thread.

FIG. 5 shows 500 reversing the order or the messages within a thread. There are several things the user may want to do when reading a thread. One is to read the thread in chronological order. Without reversing the thread, the user would have to navigate to the bottom of the thread and then read the thread from the bottom to the top.

The messages within a thread may be reversed such that the thread begins with the first sent message within the thread. According to one embodiment, a button called "Start Conversation with Original Email" may be used to reverse the entire thread so that the oldest reply in the entire thread is first. Threads typically start with the most recently sent message and goes down to the oldest, which is the original message within the email thread. Reversing the order allows the user to read the entire thread in order, which is often desirable for long threads.

Referring to the original order 510, three messages are contained within the thread. The first message (530) was sent Nov. 14, 2004 and is displayed last in thread 510. The second message (540) was sent Nov. 15, 2004 at 9:59 PM and is displayed second in thread 510. The third message (550) was sent Nov. 15, 2004 at 11:13 PM and is displayed first in thread 510. While this example thread may be easily seen in its entirety, many threads are much longer and it may be difficult for a user to navigate through the thread.

In reversed thread 520, the messages contained within the thread are reversed such that the user may now see the first message that was sent in the thread before viewing the next message that was sent in the thread. When reversed, message 530 is now displayed first in thread 520, followed by message 540 that is then followed by message 550.

FIG. 6 illustrates tagging threads 600. Threads are tagged so that portions of a thread may be easily identified. According to one embodiment, the thread is tagged according to an XML schema. Many different marking schemes may be utilized. According to one embodiment, the markup is concise to conserve space. Referring to sample email 610 it can be seen that Roberto Taboada is the sender; Deborah Harris is the receiver; the subject is "Dinner" and the message was sent Friday, Oct. 22, 2004 at 2:01 PM. The body of the message is "Where do you want to go for dinner? Roberto." According to one embodiment, each item within the message is tagged with an element. The XML Markup 620 of email 610 illustrates exemplary tagged elements. The following table illustrates an exemplary description of the elements:

| element | description |
| --- | --- |
| <html xmlns:e="urn:schemas-microsoft-com:office:mailheader"> | Namespace declaration that goes at the beginning of the email (this may be changed to meet any namespace standards). |
| e: | Namespace prefix that accompanies all elements, tying them to the new namespace (this may be easily changed so as to not conflict with any existing namespaces). |
| m | Message |
| f | From |
| s | Sent |
| t | To |
| c | CC |
| b | BCC |
| a | Subject |
| v | Value: the actual value of the field. According to one embodiment, the From field does not distinguish between individual recipients. |

Alternatively, only a portion of the elements within the email may be tagged. For instance, all of the header information could be tagged as a single unit.

FIG. 7 shows a complex thread 700. The messages within a thread 710 may come from various email programs. For example, a first message may be generated by program 1, whereas the rest of the messages within a thread may be generated by program 2. According to one embodiment, when a thread is received, it is parsed to locate the header information. The parsing identifies the header blocks for the email messages that are authored using email programs that do not utilize a markup. According to one embodiment, temporary tags are added to the thread before it is rendered. The tags may also persist. The temporary tagging helps provide the navigation features described herein when legacy versions of an email composer (or other email clients) are involved.

The XML Markup that is used to mark the email is concise in order to avoid bloat in the thread. As illustrated, very simple tags are used such that the size of the email is not significantly affected by the XML markup 720. XML markup 720 is the markup of sample email 710.

Figure 8:
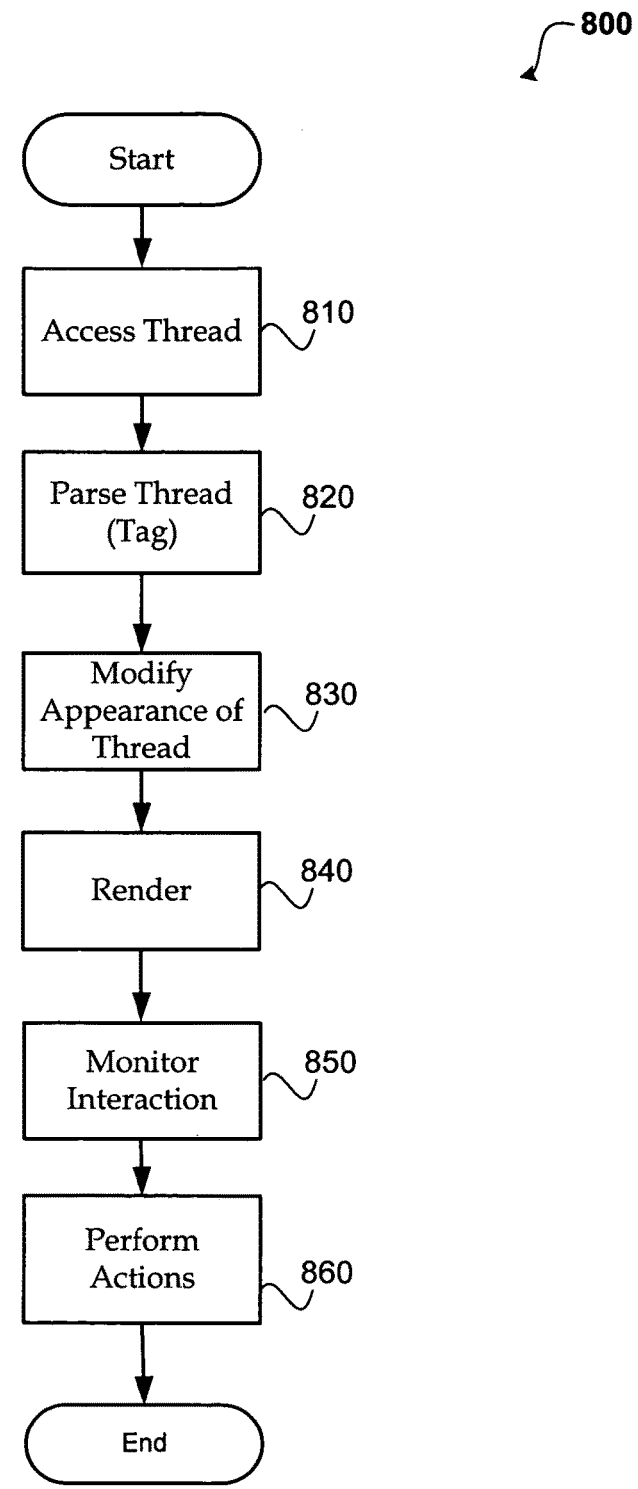
FIG. 8 shows a process for navigating through a thread, in accordance with aspects of the invention.

FIG. 8 shows a process 800 for navigating through a thread, in accordance with aspects of the invention. After a start operation, the process flows to block 810 where a thread is accessed Flowing to operation 820, the thread is parsed to determine the location of items of interest. As discussed above, according to one embodiment, the header for each message is an item of interest. Any item, however, within the thread may be designated as an item of interest. The parsing examines the thread for locations within the thread that are already tagged; identifies the ranges of the thread that were already tagged and then tags the areas of the thread that were not. At this point, the locations of the headers are known.

Moving to operation 830, the appearance of the thread, such as the headers, may be modified. For example, gradient shading could be applied to the headers; the headers could be colored; compressed/expanded; and the like. Generally, any action that is defined may be applied.

At operation 840, the thread is rendered and presented to the user for navigation through the thread. The rendered thread includes the modified appearance such that a user may more easily navigate the thread.

Flowing to operation 850, interactions with the thread are monitored to determine whether the user has activated any of the navigational features as described above. For example, the process may monitor whether the user hovers over a header. The process may also monitor to determine when a user interface button is selected.

Transitioning to operation 860, any determined navigational actions are performed. For example, according to one embodiment, when a user hovers over a header, the next and previous arrows are shown. The action may also be changing the display based upon the action of selecting a user interface control. For example, a control may be selected to reverse the thread, move to the top/bottom of the thread, move to the next/previous message within the thread, and the like.

The process then moves to an end operation and continues processing other actions.

The above specification, examples and data provide a complete description of the manufacture and use of the composition of the invention.

What is claimed is:

1. A computer-implemented method executing on a processor for navigating messages within a thread, comprising:
   accessing the thread;
   determining a location for each message header within the thread;
   modifying an appearance of each message within the thread based at least in part on each message header;
   rendering the thread to include a view of more than one message within the thread; and
   determining when a cursor is hovering over a specified portion of a message header of one of the messages within the thread; and
   in response to determining that the cursor is hovering over the specified portion of the message header of one of the messages within the thread, displaying a navigational control for navigating between the messages within the thread.

2. The computer-implemented method of claim 1, wherein modifying the appearance of each message within the thread comprises performing at least one of: changing a shading of each message header; applying a gradient shading to each message header; changing a color of each message header; collapsing at least a portion of the message header; expanding at least the portion of the message header; including an identifier within each message header; and including a selectable user interface element within at least one of the message headers that when selected performs a navigational function relating to the messages within the thread.

3. The computer-implemented method of claim 1, wherein determining the location for each message header within the thread comprises applying heuristics to the thread to identify locations of the message headers.

4. The computer-implemented method of claim 3, wherein determining the location for each message header within the thread comprises locating at least one of: a From field; a To field; a Subject field; and a Message field.

5. The computer-implemented method of claim 1, further comprising tagging the thread using a markup language; wherein tagging the thread comprises tagging at least one element that is associated with each message.

6. The computer-implemented method of claim 5, wherein the element is at least one of: a message header element; a message element; a from element; a sent element; a to element; a cc element; a bcc element; a subject element; and a value element.

7. The computer-implemented method of claim 5, wherein the tagging is temporarily associated with the thread.

8. The computer-implemented method of claim 5, wherein the markup language is an XML markup.

9. The computer-implemented method of claim 1, wherein the determining when the cursor is hovering over one of the messages comprises determining that that the cursor is hovering over a message header element.

10. The computer-implemented method of claim 1, further comprising reversing an order of the messages within the thread.

11. The computer-implemented method of claim 1, wherein the specified portion is a shaded area of the message header.

12. A computer-readable storage device having computer-executable instructions that when executed by a processor perform actions for navigating messages within a thread, comprising:
   accessing the thread;
   parsing the thread to identify each message header;
   tagging each message header according to a schema;
   modifying an appearance of each message header;
   rendering the thread to include a first view of content in a first email message within the thread, wherein content in a second email message is viewable by scrolling through the first email message;
   determining when a cursor is hovering over a specified portion of a message header of a message within the thread, wherein the specified portion is a shaded area of the message header;
   in response to determining that the cursor is hovering over the shaded area of the message header of the message within the thread, displaying a navigational control for navigating between each of the messages within the thread; and
   in response to detecting a user interaction with the navigational control, rendering a second view of content in the second email message within the thread.

13. The computer-readable storage device of claim 12, wherein the schema is an XML schema.

14. The computer-readable storage device of claim 13, wherein parsing the thread to identify each message header comprises locating at least one of: a From field; a To field; a Subject field; and a Message field.

15. The computer-readable storage device of claim 12, wherein tagging each message header according to the schema comprises tagging: a from field; a sent field; a to field; a cc field; a bcc field; and a subject field.

16. The computer-readable storage device of claim 12, wherein displaying the navigational control comprises modifying the rendering of the thread when the navigational control is selected.

17. The computer-readable storage device of claim 16, wherein the navigational control performs at least one of: moving to a next message; moving to a previous message; moving to a top of the thread; moving to a bottom of the thread; and reversing the thread.

18. A system for navigating messages within a thread, the system comprising:

at least one processor; and a memory coupled to the at least one processor, the memory comprising computer executable instructions that are executed by the at least one processor, the instructions operable to:

access an email thread associated with a plurality of email messages;

determine when a cursor is hovering over a specified portion of a message header of one of the plurality of email messages within the thread;

in response to determining that the cursor is hovering over the specified portion of the message header of one of the plurality of email messages within the thread, display a navigational control for navigating between the plurality of email messages within the thread;

render a first view of content in a first email message within the email thread, wherein content in a second email message is viewable by scrolling through the first email message; and in response to detecting a user interaction with the navigational control, render a second view of content in the second email message within the email thread.

19. The system of claim 18, wherein the render of the second view of content in the second email message within the email thread comprises navigating to a header of the second email message.

20. The system of claim 18, wherein the render of the second view of content in the second email message within the email thread comprises an arrow that navigates to each of the plurality of email messages within the thread.

* * * * *